United States Patent
Carter et al.

(10) Patent No.: US 12,162,337 B2
(45) Date of Patent: Dec. 10, 2024

(54) REMOTELY LOCATED TONNEAU COVER DRIVE SYSTEMS

(71) Applicant: EXTANG CORPORATION, Ann Arbor, MI (US)

(72) Inventors: Chad Carter, Manchester, MI (US); Jerome Facchinello, Grand Blanc, MI (US)

(73) Assignee: EXTANG CORPORATION, Ann Arbor, MI (US)

( * ) Notice: Subject to any disclaimer, the term of this patent is extended or adjusted under 35 U.S.C. 154(b) by 131 days.

(21) Appl. No.: 17/496,290

(22) Filed: Oct. 7, 2021

(65) Prior Publication Data
US 2023/0114568 A1 Apr. 13, 2023

(51) Int. Cl.
*B60J 7/057* (2006.01)

(52) U.S. Cl.
CPC .................... *B60J 7/0573* (2013.01)

(58) Field of Classification Search
CPC ........ B60J 7/0573; B60J 7/0015; B60J 7/041; B60J 7/061; B60J 7/062; B60J 7/067; B60J 7/068; B60J 7/085; B60J 7/141
USPC ...... 296/98, 100.01, 100.12, 100.18, 100.03, 296/100.05
See application file for complete search history.

(56) References Cited

U.S. PATENT DOCUMENTS

| | | | |
|---|---|---|---|
| 4,252,362 A | 2/1981 | Campbell | |
| 4,563,034 A | 1/1986 | Lamb | |
| 4,717,196 A * | 1/1988 | Adams | B60J 5/14 296/100.09 |
| 4,784,427 A * | 11/1988 | Burgess | B60J 7/068 296/100.09 |
| 4,889,381 A | 12/1989 | Tamblyn et al. | |
| 5,429,408 A * | 7/1995 | Henning | B60J 7/062 296/105 |
| 6,276,735 B1 * | 8/2001 | Champion | B60R 11/06 296/100.1 |
| 6,568,732 B2 * | 5/2003 | De Gaillard | B60R 5/047 296/37.16 |

(Continued)

FOREIGN PATENT DOCUMENTS

| | | | | |
|---|---|---|---|---|
| CN | 106347199 A | * | 1/2017 | ................ B60J 1/20 |
| EP | 1243474 A2 | | 9/2002 | |

(Continued)

OTHER PUBLICATIONS

Wang, "Environment-friendly slag transportation vehicle with device capable of preventing rain during vehicle window falling", Published: Jan. 25, 2017, Publisher: Chinese Patent Office, Edition: CN106347199A (Year: 2017).*

(Continued)

*Primary Examiner* — Jason S Morrow

(57) ABSTRACT

A tonneau cover configured to cover a cargo box of a vehicle, comprising: (a) opposing side rails configured to attach to opposing sides of the cargo box; (b) a slat extending between and supported by the opposing siderails, wherein the slat is configured to move along the siderails; and (c) a drive system that drives the slat and moves the slat along the side rails from a closed position where the slat covers an interior of the cargo box, to an open position where the interior of the cargo box is exposed, wherein the drive system is controlled wirelessly by a remote device, by a sensor located along the cargo box, or both.

20 Claims, 13 Drawing Sheets

(56) References Cited

U.S. PATENT DOCUMENTS

| | | | |
|---|---|---|---|
| 6,676,189 B2 | 1/2004 | Schall et al. | |
| 7,004,530 B2 | 2/2006 | Marx et al. | |
| 8,087,713 B2 | 1/2012 | Schrader et al. | |
| 9,352,641 B2 | 5/2016 | Chapman et al. | |
| 9,597,995 B1 | 3/2017 | Weltikol et al. | |
| 9,624,708 B2 | 4/2017 | Balay et al. | |
| 9,707,833 B2 | 7/2017 | Copp et al. | |
| 9,731,584 B2 | 8/2017 | Hannan et al. | |
| 9,834,076 B2 * | 12/2017 | Rohr | B60J 7/067 |
| 10,112,464 B2 | 10/2018 | Koengeter et al. | |
| 10,173,506 B2 * | 1/2019 | Nania | B60P 7/04 |
| 10,457,124 B2 * | 10/2019 | Bernardo | B60J 7/1607 |
| 10,603,993 B2 | 3/2020 | Ford | |
| 10,800,231 B2 | 10/2020 | Bernardo et al. | |
| 11,230,172 B2 * | 1/2022 | Nellen | E05F 15/643 |
| 2005/0093330 A1 | 5/2005 | Hoffman | |
| 2016/0236553 A1 * | 8/2016 | Stewart | B60J 7/068 |
| 2016/0288631 A1 * | 10/2016 | Parkila | B60J 7/0573 |
| 2017/0341494 A1 | 11/2017 | Hannan et al. | |
| 2018/0134132 A1 | 5/2018 | Nania | |
| 2020/0031210 A1 * | 1/2020 | Aimaq | B60J 7/068 |
| 2020/0171928 A1 * | 6/2020 | Rawnsley | B60J 7/067 |
| 2020/0353803 A1 * | 11/2020 | Pompili | B60J 7/041 |
| 2021/0155086 A1 * | 5/2021 | Pattabhiraman | B60J 7/068 |

FOREIGN PATENT DOCUMENTS

| | | |
|---|---|---|
| WO | 2018/156921 A1 | 8/2018 |
| WO | 2019/206388 A1 | 10/2019 |
| WO | 2020/234073 A1 | 11/2020 |

OTHER PUBLICATIONS

Article entitled:E-Z Power Tonno Cover, Service and Repair Manual, Webasto Product North America, Inc, dated Jul. 2002, 50 pages, www.webasto-us.com.

Canadian First Office Action dated Jan. 26, 2023, Application No. 3,136,768.

Canadian Non-Final Office Action dated Jan. 8, 2024, Application No. 3,136,768.

* cited by examiner

REMOTELY LOCATED TONNEAU COVER DRIVE SYSTEMS

FIELD

The present teachings generally relate to a vehicle, and more particularly, to a vehicle having a tonneau cover with a remotely located drive system.

BACKGROUND

Vehicle consumers continue to transition from traditional passenger sedans into Sport Utility Vehicles (SUV's) and trucks for everyday transportation and use. Accordingly, these consumers are often seeking the same conveniences found on the more traditional sedans in their SUV and truck. These conveniences may include, but are not limited to, remote starting of the vehicle, keyless entry, push-start, wireless connectivity, power-operated doors and tailgates, or a combination thereof.

In an effort to provide consumers with more of these conveniences, vehicle manufacturers and aftermarket suppliers are continuing to advance technology, making it easier and more affordable for consumers to get many of the aforementioned conveniences. For example, many traditional truck tonneau covers may include a vehicle key fob that is recognized by the vehicle from a distance to unlock the tonneau cover, illuminate the group around a truck cargo bed position the tonneau cover for opening of the tailgate, or a combination thereof.

However, the convention conveniences found in the vehicle market, and more particularly the truck market, have unfortunately not extended beyond the traditional locking and unlocking operations of the tonneau cover and/or tailgate. Additionally, due to the complex nature of SUV's and trucks, many additional accessories may be present on the vehicles that have not been designed for ease of use. For example, the tonneau cover disposed over the cargo box of the truck may require manual operation to both open and close the tonneau cover. While attempts have been made to improve operability of secondary accessories such as a tonneau cover such as by wiring a button directly to the accessories, there is still significant room for improvement. Wiring such buttons may require further running of wires throughout the vehicle, making for complex vehicle designs, additional costs in manufacturing, increased labor and materials, or a combination thereof. Additionally, hard wiring such buttons still requires a significant amount of user interaction and may have very little ability for different configurations during operation.

Similarly, the advancement of tonneau covers for vehicles has unfortunately failed address improvements in design and assembly. For example, while attempts have been made to automate tonneau cover, conventional powered tonneau covers are often cumbersome, still require significant manual interaction by the user during operation, are unable to integrate fully with a vehicle cargo box, require extensive packaging space that significantly decreases the space of the cargo box, or a combination thereof. Furthermore, the tonneau cover assemblies may often fail to operate successfully due to misalignments of the tonneau cover along one or more rails guiding the cover, thereby resulting in even further manual interaction. Still further, such tonneau covers often require significant retrofitting of a vehicle using a variety of complex assemblies and may often be unable to properly secure to the cargo box, thereby increasing the likelihood of debris and/or moisture from entering the cargo box through the tonneau cover.

Thus, there remains a need for a vehicle system that includes an easily operated tonneau cover. What is needed is an automated tonneau cover having wireless and/or remote operation free of significant user interaction. Additionally, there remains a need for an automated tonneau cover that provides consistent and reliable operation. What is needed is a tonneau cover having an automated front and/or rear panel that opens during opening and/or closing of the tonneau cover. Moreover, there remains a need for an automated tonneau cover that improves packaging and operation of the tonneau cover while also fully integrating with the cargo box of the vehicle. Therefore, what is needed is a tonneau cover having a more efficient drive system that decreases packaging space while also providing integration into the bed caps of the cargo box.

SUMMARY

The present teachings meet one or more of the present needs by providing: a tonneau cover configured to cover a cargo box of a vehicle, comprising: (a) opposing side rails configured to attach to opposing sides of the cargo box; (b) a slat extending between and supported by the opposing siderails, wherein the slat is configured to move along the siderails; and (c) a drive system that drives the slat and moves the slat along the side rails from a closed position where the slat covers an interior of the cargo box, to an open position where the interior of the cargo box is exposed, wherein the drive system is controlled wirelessly by a remote device, by a sensor located along the cargo box, or both.

In the open position, the slat may be retracted into a canister located in the interior of the cargo box. The canister may be located in front of a false bulkhead of the cargo box. Additionally, the drive system may include a motor in communication with a cable, and the cable may be directly or indirectly connected to the slat to move the slat between the closed position and the open position, or vice versa based upon movement of the motor. Moreover, the motor may be located within the canister. Furthermore, the cable may be routed through the canister and extend into the opposing siderails to directly or indirectly connect to the slat.

The present teachings may also provide a tonneau cover, wherein the cable may be secured within a channel located in an opening of the opposing side rails, and the channel may extend along a length of the opposing siderails. Additionally, the motor may include a drive gear that engages and moves the cable, thereby moving the slat along the opposing side rails. The cable may be a helical cable having a core and a helical coil wrapped around the core. The drive gear may include a plurality of teeth that mesh with the helical coil and advance the cable along the drive gear upon rotation of the drive gear, thereby moving the slat. The drive gear may be housed within a saddle mounted to the drive gear. The cable may at least partially be housed within a tube, and the cable may include an exposed portion free of the tube to allow the cable to directly contact the drive gear.

Furthermore, the present teachings may meet one or more of the present needs by providing tonneau cover, wherein the tonneau cover may include a rear panel connected to the slat and located adjacent to a tailgate of the cargo box, and the cable may be directly connected to the rear panel. The opposing side rails of the cargo box may be integrated with bed caps located along top edges of the cargo box. Additionally, a sensor may be a capacitive touch sensor located along one or more of the bed caps. Furthermore, the drive system may include a first motor located in the canister near a first side rail and a second motor located in the canister near a second opposing side rail, and the first motor and the second motor may both be in communication with the cable to move the slat. The motor may include a mounting plate, and the motor may be mounted to a body or panel of the canister by the mounting plate. The cable may be routed into an opening of the side rails that is located within the canister. The canister may be covered along an upper surface by a front panel of the tonneau cover, and the motor may be positioned directly beneath the front panel. The drive system may be entirely enclosed within the tonneau cover and the canister. Furthermore, the drive gear may move the cable in a direction transverse to a direction of movement of the slat.

The present teachings provide a vehicle system that includes an easily operated tonneau cover. Additionally, the present teachings provide: an automated tonneau cover having wireless and/or remote operation free of significant user interaction; an automated tonneau cover that provides consistent and reliable operation; a tonneau cover having an automated front and/or rear panel that opens during opening and/or closing of the tonneau cover; an automated tonneau cover that improves packaging and operation of the tonneau cover while also fully integrating with the cargo box of the vehicle; a tonneau cover having a more efficient drive system that decreases packaging space while also providing integration into the bed caps of the cargo box; or a combination thereof.

DETAILED DESCRIPTION

Figure 1:
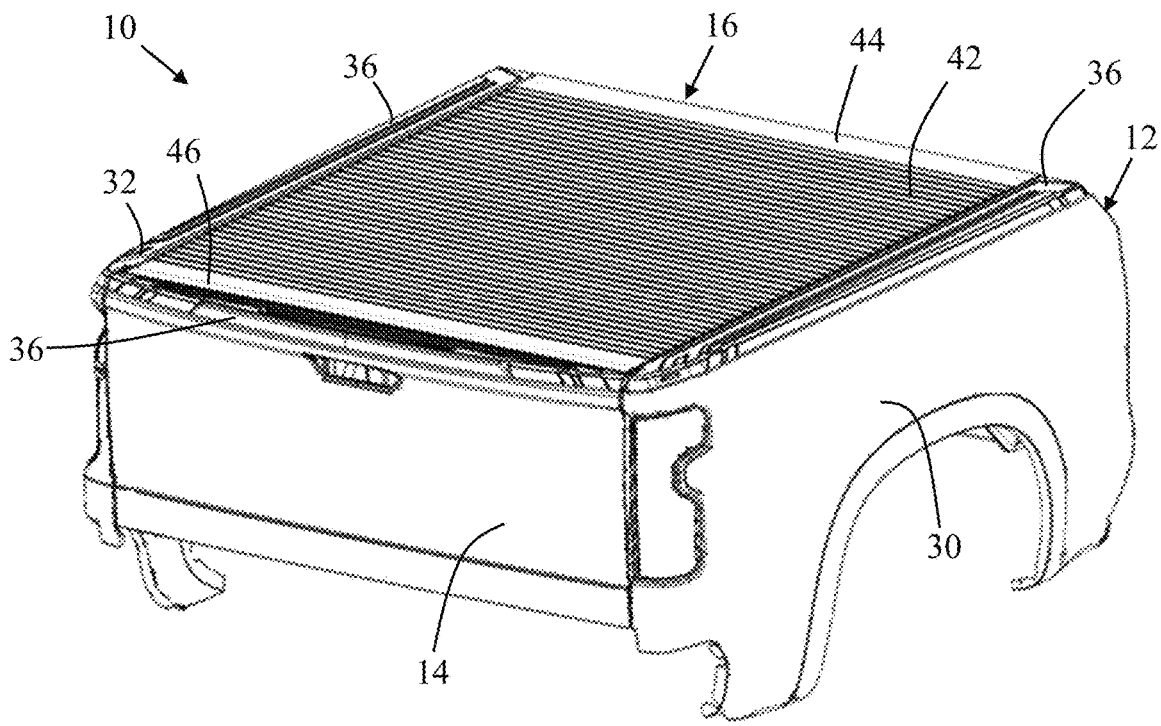
FIG. 1 is a rear perspective view of a vehicle cargo box having a tonneau cover in a closed position.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings generally relate to a vehicle and a system for a vehicle. The vehicle may be any type of automobile, such as a car, truck, SUV, commercial vehicle, or a combination thereof. The vehicle may include a system integrating one or more accessories into the vehicle. The accessories may be assembly as part of the vehicle by the Original Equipment Manufacturer (OEM), may be provided as a secondary aftermarket accessory, or a combination thereof. The accessories may include one or more lights, one or more latches, one or more actuators, one or more mirrors, one or more doors, one or more interior accessories, one or more exterior accessories, or a combination thereof.

The accessories may be located near or along a cargo box of the vehicle. The cargo box may be defined as a storage portion of the vehicle adjacent to a cabin of the vehicle. The cargo box may be partially enclosed, fully enclosed, or both. The cargo box may include one or more openings, one or more doors, or a combination thereof. The cargo box may be formed from one or more side rails, one or more fenders, one or more panels, or a combination thereof. The side rails may extend parallel to each other and may be further enclosed by the fenders, panels, or both.

The cargo box may include a tailgate. The tailgate may function to at least partially enclose the cargo box. The tailgate may function as an access point into the cargo box. The tailgate may be considered an accessory of the cargo box. The tailgate may be moveable between an open position and a closed position. The open position may be when the tailgate is substantially parallel to the ground and provides an open access point into the cargo box. The closed position may be when the tailgate is substantially perpendicular to the ground and substantially encloses at least a portion of the cargo box. The tailgate may also move and/or be secured in one or more positioned between the open position and the closed position. The tailgate may be manually operated by a user or may be actuated by one or more powered actuators. The tailgate may operate with physical user interaction or may be actuated remotely.

The tailgate may be used in conjunction with a tonneau cover. The tonneau cover may function to protect against dirt, debris, water, other contaminants, or a combination thereof from entering an inside of a cargo box. The tonneau cover may be a cover that functions to conceal the inside of the cargo box and/or any contents inside the cargo box. The tonneau cover may be placed over the cargo bed of a vehicle, such as a pickup truck. As such, the tonneau cover may also be considered an accessory of the vehicle.

The tonneau cover may comprise multiple enclosure panels or a single panel. One or more of the panels may be slats. One or more of the slats may be moved or repositioned relative to one another to move the tonneau cover between an open position and a closed position. One or more of the slats may be substantially rigid. One or more of the slats may be substantially flexible but may be stabilized with a rigid frame. One or more of the slats may be interconnected to form the tonneau cover. Thus, the slats may be moved, pivoted, or both independent or simultaneously.

Some of the panels may slats while others may be a panel of a different structure. For example, a plurality of interconnected slats may form a portion of the tonneau cover. Additionally, a front and/or rear panel may be located at opposing ends of the interconnected slats. The front and/or rear panel may be configured for pivoting, rotation about a hinge-point, or both while the interconnected slats may be substantially free of pivoting and/or rotation, and the slats may be configured for guidance along the side rails of the cargo box. Thus, it may be gleaned from the present teachings that the tonneau cover may provide various functionality within the slats or other panels of the tonneau cover.

The open position of the tonneau cover may be when the tonneau cover, or at least one enclosure panel of the tonneau cover, is free from contacting, engaging, or is spaced apart from: the tailgate, a top edge of the tailgate, the walls of the cargo bed, a top edge or top surface of the one or more walls of the cargo bed, or a combination thereof. The closed position of the tonneau cover may be when the tonneau cover, or at least one enclosure panel of the tonneau cover, is in contact with, engages, or rests on the tailgate, a top edge or top surface of the tailgate, a top edge or top surface of the one or more walls of the cargo box, or a combination thereof, but applies less force or pressure thereon compared to when the tonneau cover is in the closed or lowered position. Therefore, the tonneau cover may also provide one or more positions where the tonneau cover may be partially open or raised partially closed or lowered, or a combination thereof. For example, a partially opened or partially closed position may be defined as one or more enclosure panels spaced apart from the walls or side rails of the cargo bed while a plurality of interconnected slats remains in contact with the side rails to cover a portion of the cargo box.

The tonneau cover may be operated manually by a user. The tonneau cover may be electronically actuated between the open position and the close position, or one or more positions therebetween. Electronic actuation of the tonneau cover may be triggered by one or more interactions from the user. These interactions may include, but are not limited to: one or more commands entered into a wireless application (e.g., an application on a mobile device, tablet, computer, etc.); one or more buttons or commands entered on a wireless fob (e.g., a key fob); a user nearing the vehicle within a proximity range that senses the users presence and sends a signal for electronic actuation of the tonneau cover; one or more sensors or buttons along the vehicle physically touched by the user; one or more voice commands; one or more physical motions of the user recognized by one or more sensors and/or cameras along the vehicle; or a combination thereof.

It is also envisioned that the electronic actuation may be based on a plurality of the commands identified above. For example, a vehicle may include one or more sensors such as a capacitive touch sensor located along a bed cap of the cargo box that allows for actuation of the tonneau cover by contact with the capacitive touch sensor via a user. Additionally, the user may also utilize a mobile application and/or key fob to operate the same tonneau cover in communication with the capacitive touch sensor. Examples of such interactions and vehicle configurations can be found in U.S. patent application Ser. No. 17/005,162, filed on Aug. 27, 2020, all of which is incorporated herein for all purposes.

The tonneau cover may be electronically actuated to retract from the closed position (i.e., a position where the tonneau cover is in contact with the cargo box to enclose the cargo box) to the open position (i.e., a position where the tonneau cover is free of enclosing the cargo box). In the open position, all or a portion of the tonneau cover may be contained within a canister.

The canister may function to house one or more panels, one or more slats, or both of the tonneau cover. The canister may house the panels and/or slats in a fully open position of the tonneau cover, in a semi-open position of the tonneau cover or both. The fully open position may be considered retraction of the tonneau cover (e.g., slats of the tonneau cover) into the canister. Thus, when in such a retracted or open position, the slats may be contained in the canister and free from view.

To house the slats and/or panels of the tonneau cover, the canister may include a canister body. The canister body may define a shape of the canister to house the slats and/or panels. The canister body may be configured for packaging within the cargo box. For example, the canister body may extend between opposing side walls or panels of the cargo box transverse to a length of the cargo box. The canister body may be enclosed by one or more side panels. The side panels of the canister may cap open ends of the canister body.

The side panels of the canister may be a track panel. The track panel may function to guide the slats and/or panels of the tonneau cover within the canister. To facilitate such guidance, the track panel may include a track that receives the slats and/or panels and directs the slats and/or panels within the canister. The track panels may be configured to guide the slats and/or panels such that the slats and/or panels are at least partially coiled within the canister to improve packaging. The track panels may also be positioned on opposing sides of the canister body to engage opposing sides of the slats and/or panels.

While a visible canister may be mounted within the cargo box (e.g., near a front of the cargo box closes to a cab of the vehicle), the canister may also be housed within a false bulkhead. The false bulkhead may be created by mounting a bulkhead panel offset from a front of the cargo box to create an enclosed space to house the canister. Similarly, the false bulkhead may also be used in lieu of a canister to house the tonneau cover in an open or retracted position. Therefore, it is envisioned that the false bulkhead may include opposing track panels without a canister body to guide the slats and/or panels of the tonneau cover during retraction and/or extension. As such, the present teachings may beneficially provide a hidden compartment to house the tonneau cover when in the retracted or open position while the cargo box looks visually unchanged to a user. However, it should also be noted that the tonneau cover may also be housed in a portion of the cargo box or vehicle other than a canister or false bulkhead. For example, it is envisioned that the tonneau cover may be integrated with the actual bulkhead and/or passenger cabin of the vehicle so that, when in an open or retracted position, the tonneau cover may be positioned or otherwise contained within the actual bulkhead or an area between the bulkhead and the passenger cabin. That is, the bulkhead or portion of the vehicle between the bulkhead and the passenger cabin may contain a cavity or hollow portion that may container the tonneau cover. As such, it may be gleaned from the present teachings that a variety of storage solutions may be implemented to contain the tonneau cover as described herein.

The canister or false bulkhead may include an opening to receive the slats and/or panels. However, such an opening may be at least partially enclosed when the slats and/or panels are fully enclosed within the canister or false bulkhead, are fully removed from the canister or bulkhead, or both. To enclose the opening, a front panel of the tonneau cover may be disposed over the opening.

The front panel may extend across the opposing side walls or side rails of the cargo box. The front panel may be located nearest a cab of the vehicle where the tonneau cover is housed when in an open or retracted position. The front panel may function to pivot between an open position and a closed position. The open position may be defined as a position where the front panel is disconnected from, or space apart from, the side rails, canister opening, bulkhead opening, or a combination thereof. The closed position may be defined as a position where the front panel is in contact with, or engages, the side rails, canister opening, bulkhead opening, or a combination thereof to enclose the canister and/or bulkhead.

The front panel may be driven by one or more actuator assemblies. The actuator assembly may function to move the front panel between the open position and the closed position, or vice versa. The actuator assembly may be in communication with the front panel, directly or indirectly, to articulate the front panel between the open position and the closed position, one or more intermediate positions between the open and closed positions, or a combination thereof.

A single actuator assembly or a plurality of actuator assemblies may move the front panel. The actuator assembly or assemblies may be positioned adjacent to the front panel. Beneficially, the actuator assembly may be located within the canister or false bulkhead to hide the assembly from view of a vehicle user. Additionally, it should also be noted that while movement of the front panel is described herein in further detail, one or more additional panels of the tonneau cover may also utilize a similar actuator assembly for movement. For example, a rear panel closest to a tailgate of the vehicle may also actuate between an open position and a closed position to facilitate opening and/or closing of the tailgate when the tonneau cover is in a closed position. Examples of an actuator assembly that may be used for movement of one or more panels of the tonneau cover can be found in U.S. patent application Ser. No. 16/953,839, filed on Nov. 20, 2020, all of which is incorporated herein for all purposes.

The actuator assembly may include an actuator. The actuator may function to actuate the front panel between the open position and the closed position, or somewhere therebetween. The actuator may move the front panel directly by direct contact between a moving member or the actuator and the front panel. Similarly, the actuator may indirectly move the front panel by one or more interconnected links, cables, cranks, hinges, or a combination thereof interconnected between the actuator and the front panel.

Similar to movement of the tonneau cover, the actuator may receive wireless input or may receive a signal over wiring connected to the actuator. A button, sensor, latch, switch, other mechanism, or a combination thereof along the vehicle may be wired to the actuator so that an operation of the button, sensor, latch, switch, other mechanism, or a combination thereof may send a signal to the actuator to move the front panel. For example, one or more capacitive touch sensors along the vehicle may be touched by a user to send a signal to the actuator to open or close the front panel. Similarly, the actuator may be triggered to move the front panel due to an input command received for movement of the tonneau cover, movement of the tailgate, or both. For example, a command by a user to retract or open the tonneau cover may automatically send a signal to the actuator to open the front panel.

The actuator may be powered via a power device located on the vehicle. The power device may be a vehicle battery. The power device may be a dedicated power source, such as an independent battery located near or within the cargo box. The actuator may be solar powered. The actuator may be rechargeable.

The actuator may be mounted to a mounting plate. The actuator may be positioned within the confines of the false bulkhead or canister to hide the actuator from view, protect the actuator from moisture and/or debris, or both. The mounting plate may be secured anywhere along the cargo box to facilitate communication between the actuator and the front panel. For example, it is envisioned that the mounting plates may be secured to the track panels or side panels of the canister and/or false bulkhead to position the actuator adjacent to the front panel.

A moving portion of the actuator may be in communication with a crank of the actuator assembly. The moving portion, such as a shaft of the actuator, may be connected to the crank such that movement of the moving portion in turn articulates the shaft. The crank may be free to rotate at least partially about a pivot point based on actuation of the actuator. For example, the crank may be movably secured to the mounting plate to allow defined movement of the crank.

The crank may be in communication with a link of the actuator assembly. As such, movement of the crank by the actuator may result in the crank moving the link in a desired direction. That is, the crank may function to move the link of the actuator assembly. The crank may substantially rotate about an axis of rotation due to movement of the actuator. Based upon this rotation, a portion of the crank (e.g., an arm, projection, body, etc.) connected to the link may also rotate. As the crank rotates, the portion of the crank connect to the link may actuate the link in a desired direction. The desired direction of travel may be defined by a guide slot of track along the mounting plate. Similarly, the crank and/or link may be mounted to allow only particular articulation based upon the mounting scheme.

The link may extend between the crank and a driveshaft. The driveshaft may function to connect to the front panel and articulate the front panel. The driveshaft may be an extension of the link. For example, the driveshaft may project from a terminal end of the link. The driveshaft may extend perpendicular to a length of the driveshaft. For example, the link may be substantially adjacent to a surface of the mounting plate while the driveshaft extends inwardly into the canister or false bulkhead to engage the front panel. The drive shaft may thus be any desired size and/or shape to engage the front panel and facilitate movement of the front panel.

The driveshaft may be received by a barrel of the front panel. The barrel may be integrally formed with an underside (i.e., a bottom surface) of the front panel so that the barrel may be positioned within the confines of the false bulkhead or canister. The barrel may be overmolded or otherwise formed with the front panel. Similarly, the barrel may be fixedly secured to the front panel.

As the link of the actuator assembly is rotated due to movement of the crank, the driveshaft is rotated about its center axis. As the driveshaft extends into the barrel and is connected to the barrel, rotation of the driveshaft may also rotate the barrel about the axis of the driveshaft. That is, the barrel and the driveshaft may be coaxial.

The barrel may be secured to the driveshaft in any desired manner. For example, a mechanical interlock such as a press-fit condition may engage the driveshaft and the barrel. Additionally, one or more fasteners may secure the barrel and driveshaft together. For example, the barrel and the driveshaft may have respective pin holes that receive a pin extending through both the barrel and the driveshaft, thereby connecting the barrel and driveshaft so that movement of the driveshaft moves the barrel and thus the front panel. As such, the driveshaft rotates the barrel to move the top panel and provide ingress and/or egress from the canister or false bulkhead for one or more slats.

As discussed above, the slats and/or panels of the tonneau cover may be electronically powered to move between the open and closed positions. Such movement may be done using a drive system of the tonneau cover The drive system may function to power the tonneau cover and move the tonneau cover from the open position to the closed position, or vice versal. The drive system may function to move the slats along opposing side rails to guide the slats into or out of the canister or false bulkhead. The drive system may include a plurality of interconnected components that help move the tonneau cover based upon user input. Thus, the drive system may include one or more power sources, such as a battery, to move the tonneau cover.

The drive system may include one or more configurations to move the tonneau cover. The drive system may be a gear drive system. The drive system may be a drum drive system. The drive system may a combination of a gear drive system and a drum drive system.

The drive system may include a motor. The motor may function to directly or indirectly move the tonneau cover between the open and closed positions, or vice versa. The motor may be in communication with the tonneau cover to close and/or retract the tonneau cover. The motor may be any desired motor to drive the tonneau cover, such as a DC motor, an AC motor, a brushless motor, another type of motor, or a combination thereof.

The motor may function to drive a cable connected to the tonneau cover. To drive the cable, the motor may include one or more gears (i.e., a motor within a gear drive system), one or more rotating drums (i.e., a drum drive system), or a combination thereof. The gears or the drums may create tension on the cable connected to the tonneau cover so that movement of the cable caused by the motor may also move the tonneau cover.

In a gear drive system, the motor may include one or more drive gears. The drive gears may function to mesh with the cable to move the cable in a desired direction. As such, the drive gear may rotate, and such rotation may result in moving the cable in a substantially linear direction. It should be noted that the substantially linear direction of movement of the cable may be localized near the meshing between the drive gear and the cable.

To facilitate such meshing of the cable and the drive gear, the cable may have one more teeth that extend outwardly to engage the cable. The teeth may be received by one or more features of the cable to move the cable along the drive gear. As discussed below, the cable may be a helical cable having a coil wrapped around a core of the cable. The coil may engage the teeth of the drive gear to move the cable.

While a helical cable is described in further detail below, any desired shape or configuration of cable may be utilized in the drive system. For example, the cable may be free of a coil surrounding a core and may instead include one or more divots, channels, barbs, notches, projections, or a combination thereof that engage the teeth of the drive gear and move the tonneau cover. The type of cable may also be selected based upon the drive system configuration being utilized. For example, a helical cable may be better suited for a gear drive system whereas a cable free of a coil or the aforementioned features may be configured for use with a drum drive system.

In a drum drive system, the motor may be connected to a rotating drum. The drum may function to rotate and, upon rotation, coil the cable around a body of the drum. As a result, the tension is provided on the cable, thereby moving the tonneau cover connected to the cable. Thus, the drum may rotate about an axis of a driveshaft of the motor so that rotation of the driveshaft rotates the drum. Moreover, the cable may be engaged or otherwise connected to the drum to ensure contact between the cable and the drum during movement. For example, one or more pulleys, one or more clamps, one or more cable ties, or a combination thereof may be utilized to secure the cable in a desired position and ensure movement of the cable in a desired direction to effectively move the tonneau cover.

It is also envisioned that the cable may be at least partial secured within a tube. The tube may function to protect the cable from debris or moisture that may degrade the cable, thereby impacting performance of the drive system. The tube may partially or fully encapsulate an outer circumference of the tube. The tube may extend along an entire length or a portion of the length of the cable. For example, the tube may enclose the cable except for localized, exposed regions of the cable. Such exposed regions may allow for engagement of the cable with the motor (i.e., a drum and/or drive gear of the motor), allow for connection to one or more slats and/or panels of the tonneau cover, facilitate routing through one or more tight packaging constraints (e.g., a hole having a smaller diameter than a diameter of the tube), or a combination thereof. Therefore, it is envisioned that routing of the tube and/or cable may be particular to a desired configuration for a vehicle. Thus, the tube may be selected based upon varying packaging constraints.

As discussed above, the tube may not protect one or more localized, exposed portions of the cable that interact with the motor. However, to still protect the cable from moisture and/or debris, the motor may include a housing or cover to at least partially enclose the interaction between the motor and the cable.

For example, a drum cover may be disposed over a portion of the drum so that an exposed portion of the cable being wound around the drum may be protect from moisture and/or debris. The cover may include one or more openings to guide the cable into and out of the drum cover, thereby still allowing movement of the cable caused by the motor.

Similarly, the drive gear of a motor may be positioned within a cavity of a saddle. The saddle may be a bracket or secondary housing secured to the motor. The saddle may include one or more notches or openings to route the cable through the saddle and engage the drive gear, thereby still allowing movement of the cable, and thus the tonneau cover. The saddle may substantially enclose the drive—and a portion of the cable meshing with the drive gear—within a cavity or inner hollow portion of the saddle, thereby preventing moisture and/or debris from contacting the meshing portion of the cable and the drive gear.

As discussed herein, the drive system may move one or more slats along side rails to open and close the tonneau cover. The side rails may function to guide the tonneau cover between the open position and the closed position. The side rails may abut one or more surfaces of the cargo box so that the tonneau cover may be secured to the cargo box. The side rails may include one or more projections, one or more protrusions, or both that mate to a surface of the cargo box. For example, the side rails may include a mounting portion that is positioned substantially parallel to a vertical sidewall of a cargo box so that, when installed, the side rail abuts the sidewall in a substantially flush manner (i.e., the abutment is substantially free of gaps between the mounting portion and the vertical lip). The side rails may abut the sidewall in a manner other than substantially flush. For example, a gap may exist between the side rail and the sidewall, yet the tonneau cover system may still properly function. The side rail may be a unitary piece or may comprise a plurality of components. For example, the side rail may be a single injection-molded piece having a plurality of integrated projections. Alternatively, the side rail may include a body having one or more projections fastened or adhered to a surface of the body.

The side rails may include a support portion. The support portion may function to abut a surface of the cargo box and maintain a position of the retainer relative to the cargo box. The mounting portion may mate with the one or more sidewalls, a tailgate, or both. The support portion may extend at an angle substantially perpendicular to the one or more sidewalls, one or more tailgates, or both. The support portion may extend at an angle other than substantially perpendicular to the one or more sidewalls, one or more tailgates, or both. For example, the angle between the support portion and the one or more sidewalls, one or more tailgates, or both may be about 30 degrees or more, about 45 degrees or more, or about 60 degrees or more. The angle may be about 135 degrees or less, about 120 degrees or less, or about 105 degrees or less (e.g., about 90 degrees). The support portion may be structurally rigid to support the tonneau cover, one or more users, other items, or a combination thereof. The support portion may be flexible to prevent fracturing of the support portion when the vehicle is being operated (e.g., while the vehicle is driven). The support portion may be integrally (i.e., monolithically) formed with the side rails or may be a secondary component secured to the side rails. The support portion may include one or more surfaces that have a similar contour to one or more surfaces of the cargo box. For example, the sidewall of the cargo box may include a convex surface while the support portion includes a concave surface to mate with the sidewall. The support portion may be configured to prevent unwanted movement of the retainer. For example, the support portion may rest on a top surface of the sidewalls (i.e., along a bed cap or top edge of the cargo box) so that the side rails do not slide along the sidewalls. The support portion may be removably attached to the cargo box via one or more fasteners, one or more adhesives, or both. The support portion may be free of one or more fasteners, one or more adhesives, or both. For example, the support portion may rest on a surface of the cargo box while a mounting portion of the side rail is secured to the cargo box.

The mounting portion may function to abut one or more surfaces of the cargo box so that the side rail may be secured to the cargo box. The mounting portion may be fixedly or removably attached to the cargo box. The mounting portion may be secured to the cargo box using one or more adhesives, one or more fasteners, or both. The mounting portion may include one or more contoured surfaces, one or more substantially flat surfaces, or both. For example, the mounting portion may include a substantially flat surface to abut the sidewall, and also include an opposing contoured surface to route one or more cables, weatherstripping, other items, or a combination thereof.

The side rails may also include an opening. The opening may function to receive an end portion of the slats and/or panels of the tonneau cover. The opening may be formed between an overhang portion of the side rail—that is, a portion of the side rail that overhands an upper surface of the slats and/or panels—and a lower lip. The slats and/or panels may extend into the opening between the lip and the overhand portion to facilitate guidance of the tonneau cover along the side rails. As a result, the overhand portion and/or the lip may extend towards opposing surfaces of the slats and/or panels to prevent moisture and/or debris from entering the opening. As discussed further below, one or more seals along the overhand portion, the lip, or both, may compressibly engage the slats and/or panels to further prevent moisture and/or debris from entering the opening.

The opening may include a wear strip. The wear strip may function to contact the slats and/or panels and guide the slats and/or panels along the side rail. The wear strip may prevent degradation of the side rail due to friction between the tonneau cover and the side rails (i.e., dragging the slats along the side rail). The wear strip may be positioned to support the slats and/or panels.

For example, each slat may include a slat end cap. The slat end cap may be secured to a terminal end of the slat. The end cap may function to engage the wear strip within the opening of the side rail. The end caps may slide along the wear strip to open and close the tonneau cover. The end caps may act as a rise to ensure the slats sit above the lip of the opening, thereby more freely allowing the slats to move along the side rails while still maintaining sufficient moisture and/or debris protection for the opening.

The slats may also include one or more bearings. The bearings may function guide the slats along the side rails. The bearings may be used in lieu of, or in conjunction with, the slat end caps discussed above. Beneficially, the bearings may decrease friction between the slats and the side rail so that the slats more freely move along the side rails. For example, the bearings may be positioned within the opening of the side rail so that the bearing may act as a wheel to move the slat along the side rail.

The bearings may be connected to a terminal end of each or some of the slats. The bearings may be positioned within the opening of the side rails to guide the slats along the side rails. The bearings may be secured to an extension of the slats. The extension may be integrally (i.e., monolithically) formed with the slats so that the extension extends at least partially into the opening of the side rails. As a result, the extension may position the bearings within the opening to allow for proper movement of the tonneau cover.

Due to decreased wear between the bearing and the side rail during movement, the side rail may be free of a wear strip within the opening that may be used to contact the end caps. Alternatively, the opening may include a support surface having one or more projecting ribs that guide the bearings of the slats. The ribs may extend along a length of the side rails to further guide the bearings and thus the slats. It should be noted, however, that while the support surface within the opening of the side rail may include one or more ribs, the support surface may also still include a wear strip to guide the bearings if desired. That is, the configuration of the slats and side rails may be customizable to meet various tonneau cover configurations.

As discussed herein, the drive system of the tonneau cover may utilize one or more cables connected to the tonneau cover (e.g., connected to slats and/or panels of the tonneau cover) to drive the tonneau cover between the open position and the closed position. To further improve packaging constraints of the tonneau cover, the cable may beneficially be routed through the side rails, thereby fully integrating the drive system within the tonneau cover. That is, the cable may be substantially or entirely hidden from the view of a vehicle user. For example, the side rails may be integrated with bed caps of the cargo box and thus the cables and drive system may also look to be visually integrated with the bed caps of the cargo box. As a result, the tonneau cover may visually look to be an OEM product and not an aftermarket component.

To create such integration, the side rails may include one or more channels to route the cables, wires, other items, or a combination thereof. The channels may be fully or partially enclosed to secure the cables. The channels may extend along a length of the side rails so that the cables may be routed into or through holes along the side rails to connect the cables between the tonneau cover and the drive systems through the side rails. As such, the cables may advantageously not encroach on an interior of the cargo box, thereby optimizing storage space within the cargo box.

Turning now to the figures, FIG. 1 is a rear perspective view of a cargo box 12 of a vehicle 10. The cargo box 12 may be defined by one or more outer fenders 30 connected to a tailgate 14. Similarly, while not shown for simplicity, the cargo box 12 may also be connected to vehicle cab and/or may include a bulkhead panel to fully enclose a perimeter of the cargo box 12.

The cargo box 12 may be enclosed by a tonneau cover 16. As illustrated, the tonneau cover 16 is in a closed position, whereby a plurality of interconnected slats 42 extend across substantially all of the cargo box 12 to enclose the cargo box 12 in conjunction with the outer fenders 30 and the tailgate 14. To access an interior of the cargo box 12 when the tonneau cover 16 is in the closed position, a user may open the tonneau cover 16 (i.e., retract the tonneau cover 16) partially or entirely, may open the tailgate 14, or a combination thereof.

The slats 42 of the tonneau cover 16 may extend transversely across the cargo box 12 (i.e., across a width of the cargo box 12). To slats 42 may be secured to—or at least partially within—bed caps 36 of the vehicle 10. For example, bed caps 36 located along a top surface or edge of the outer fenders 30 may include or be connected to a side rail that supports the tonneau cover 16, as discussed further below. Additionally, the tailgate 14 may also include a bed cap 36 that substantially aligns with the bed caps 36 of the side bed caps 36 positioned along the outer fenders 30. The bed cap 36 of the tailgate 14 may also engage the tonneau cover 16.

The tonneau cover 16 may also include a front panel 44 and a rear panel 46 located near opposing endpoints along a length of the tonneau cover 16. The front panel 44 and/or the rear panel 46 may facilitate proper opening and/or closing of the tonneau cover 16 during operation. For example, the front panel 44, the rear panel 46, or both may articulate to disengage connection from the tailgate 14, the outer fenders 30, slats 16 of the tonneau cover, or a combination thereof, thereby allowing the tonneau cover 16 to freely move during operation.

Figure 2:
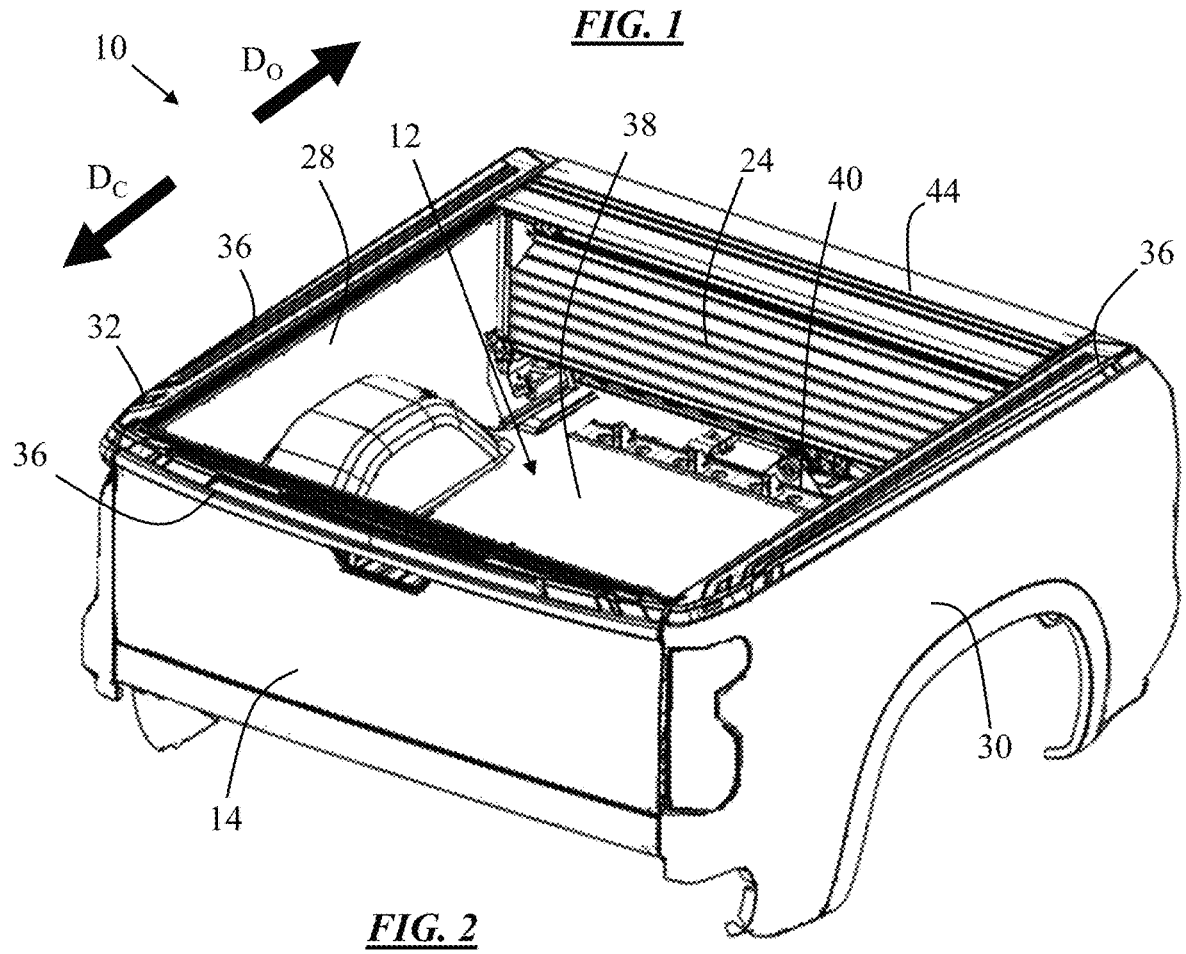
FIG. 2 is a rear perspective view of the vehicle cargo box of FIG. 1 having the tonneau cover in an open position.

FIG. 2 illustrates a rear perspective view of the cargo box 12 of the vehicle 10 shown in FIG. 1. As shown, the tonneau cover 16 is now in a fully open position, whereby the tonneau cover is no longer visible and is enclosed within a canister 24. The canister 24 may be positioned toward a front side of the cargo box 12 located adjacent to a vehicle cab (not shown). For the canister 24 to receive the tonneau cover, the tonneau cover is moved in an opening position ($D_O$) until all or a portion of the slats are positioned within the canister 24. Therefore, it should be noted that the tonneau cover may open fully or partially at any number of intermediate positions during opening (i.e., retraction). Similarly, the tonneau cover may move in a closing direction ($D_C$) to extend the slats out of the canister 24 to fully or partially enclose the cargo box 12 in conjunction with the bed caps 36. As such, the closing and opening operations may both facilitate incremental movement of the tonneau cover to a plurality of positions.

During movement of the tonneau cover, the front panel 44 positioned over the canister 24 may articulate to allow for one or more slats, the rear panel of the tonneau cover, or a combination thereof to enter and/or exit the canister 24. Therefore, the front panel 44 may beneficially provide a door to the canister 24 to substantially prevent debris and/or moisture from entering the canister 24 (see FIGS. 18-21). It should also be noted that the front panel 44 may also be configured to remain stationary during movement of the tonneau cover in certain applications.

The tonneau cover may be automated to open and close the tonneau cover. To facilitate automation of the tonneau cover, a motor 40 may be located within the cargo box 12 and connected to a drive system of the tonneau cover, which is further discussed below. Such a drive system may include one or more cables, one or more pulleys, one or more actuators, or a combination thereof to move the tonneau cover along side rails of the cargo box 12. The motor 40 may be located anywhere within the cargo box 12. However, to optimize packaging, it is envisioned that the motor 40 may be positioned near or adjacent to the canister 24 configured to house the tonneau cover in the open position. Therefore, the motor 40 may be mounted along floor 38 of the cargo box 12, may be located along one or more panels of the canister 24 (e.g., a bulkhead panel of the canister), may be mounted to one or more inside panels 28 of the cargo box 12, or a combination thereof. Thus, it is envisioned that packaging of the motor 40 may vary depending on vehicle configuration, thereby even further ensuring minimal packaging space is used for the drive system.

Utilizing the above-mentioned drive system, the tonneau cover 16 may be beneficially operated remotely using a key fob, wireless device, or a combination thereof. For example, the tonneau cover 16 may be operated using an application on a user's mobile phone or one or more buttons located on a vehicle key fob. Similarly, a user may also automate operation of the tonneau cover 16 by contacting a sensor 32 located along the cargo box 12, such as along one or more bed caps 36 of the vehicle. For example, the bed caps 36 may include one or more capacitive touch sensors 32 that allow for operation of the tonneau cover 16 free of a remote application or device. Examples of capacitive touch vehicle accessories and near-field operation of a tonneau cover can be found in U.S. patent application Ser. No. 17/005,162, filed on Aug. 27, 2020, all of which is incorporated herein in its entirety. However, it is also envisioned that other types of sensors and/or buttons may also be implemented other than capacitive touch sensors 32.

Figure 3:
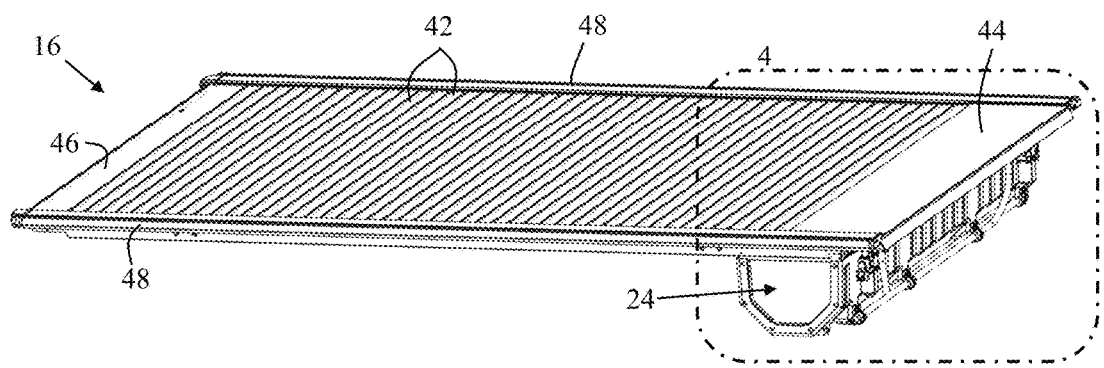
FIG. 3 is a perspective view of a tonneau cover in accordance with the present teachings.

FIG. 3 illustrates a perspective view of a tonneau cover 16 in accordance with the present teachings. The tonneau cover 16 is shown independent of a vehicle cargo box for simplicity.

The tonneau cover 16 includes a plurality of interconnected slats 42 configured to extends along a width of a cargo box. The slats 42 may extend between, and be supported by, opposing side rails 48. As discussed above, the side rails 48 may be integrated with bed caps positioned along a top edge of the outside fenders 30 of the cargo box 12. For example, the bed caps may include the structure of the side rails 48 as a substantially one-piece design. Similarly, the side rails 48 may be first mounted to the upper portion (e.g., a top edge, an upper portion of the inner panels of the cargo box, etc.) of the outer fenders or inner panels and then the bed caps may be mounted directly onto or over the side rails 48. As a result, final assembly of the tonneau cover 16 may beneficially provide a streamlined and monolithic (i.e., one-piece) visual configuration.

The tonneau cover may also include a front panel 44 and a rear panel 46. The rear panel 46 may be positioned near an end along the length of the tonneau cover 16. The rear panel 46 may be configured to engage or abut the tailgate or a bedcap of the tailgate (see FIG. 1). Conversely, the front panel 44 may be positioned near an opposing end of the tonneau cover 16 along the length of the tonneau cover 16. The front panel 44 may be positioned directly over a canister 24 that receives the tonneau cover 16 during closing or retraction of the tonneau cover 16. The front panel 44 may also be configured to abut or connect to a bulkhead of the vehicle, and outer panel of the vehicle cab, or both. Thus, the tonneau cover 16 may fully enclose the cargo box when desired.

Figure 4:
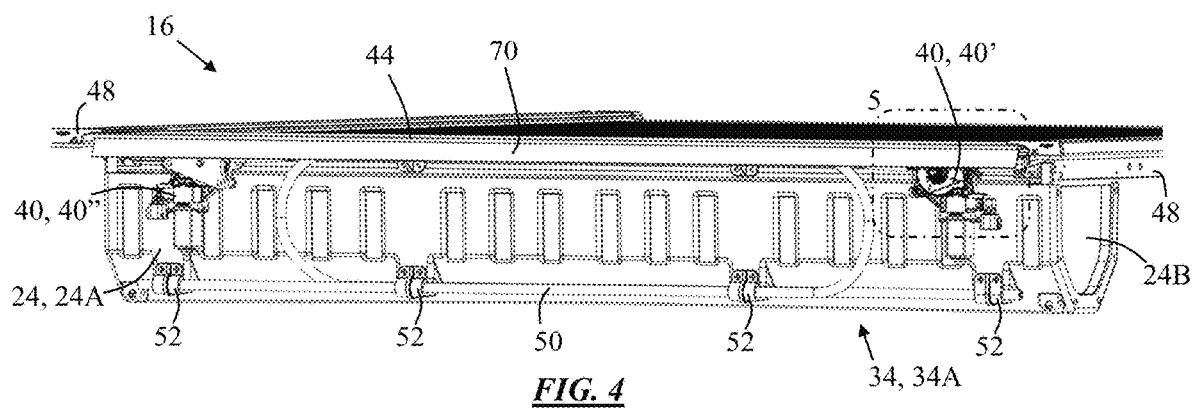
FIG. 4 is close-up view 4 of the tonneau cover of FIG. 3 illustrating a gear drive system of the tonneau cover.

FIG. 4 illustrates close-up view 4 of the tonneau cover 16 shown in FIG. 3. The close-up view is intended to further detail the front portion of the tonneau cover 16 near or along the canister 24.

The canister 24 includes a canister body 24A and a plurality of canister side panels 24B. The canister side panels 24 B are secured to the canister body 24A via one or more fasteners or mechanical interlocks for a substantially or fully enclosed container to house the tonneau cover when in the open position. As discussed above, the canister 24 may be positioned within the cargo box near a vehicle cab or bulkhead of the vehicle. However, it should also be noted that the canister 24 may also be integrated with the bulkhead to ensure that the visual look of the cargo box remains undisturbed. For example, the canister 24 may include or be connected to one or more false bulkhead panels that not only hide the canister 24 and/or the tonneau cover 16 while in a closed position, but also visually make the cargo box look as if no tonneau cover 16 exists when the tonneau cover 16 is in the closed position. Therefore, such bulkhead panels may extend and look identical to the actual bulkhead of the vehicle but may be offset from the bulkhead to create a hidden compartment that houses the canister 24 or the tonneau cover 16 free of an additional canister 24 (i.e., the hidden compartment formed by the false bulkhead provides a canister in and of itself). However, as discussed above, the actual bulkhead may be manufactured to include a structural cavity in which the tonneau cover 16 may be housed, thereby eliminating the need for a canister 24 or false bulkhead panel. For example, an Original Equipment Manufacturer (OEM) may design a vehicle bulkhead to include an integrated container for the tonneau cover 16.

As shown in FIG. 4, the tonneau cover 16 may also include a front panel 44 and weatherstripping 70 extending along a length of the front panel 44 between the two opposing side rails 48. The front panel 44 may be positioned directly over the canister 24 and may act as a door for the canister 24 by articulating during operation to allow the tonneau cover 16 to retract into the canister. The front panel 44 may then close after opening to abut the canister 24 and prevent debris and/or moisture from entering the canister 24. Similarly, the front panel 44 may be located adjacent to a bulkhead or vehicle cab so that the weatherstripping 70 contacts the bulkhead or outer surface of the vehicle cab and prevents debris and/or moisture from entering a gap that may be present between the tonneau cover 16 and the bulkhead or vehicle cab.

The tonneau cover 16 may also include a drive system 34 that automates opening and/or closing of the tonneau cover 16. The drive system 34 may be a gear drive system 34A and may include one or more motors 40 in communication with a cable routed along the tonneau cover 16. It should be noted that a single motor 40 or a plurality of motors 40 may be used for the drive system 34. For example, as shown in FIG. 4, a first motor 40A and a second motor 40B may be positioned along the canister body 24A near opposing side rails 48 of the tonneau cover 16. The motors 40 may be used simultaneously or in conjunction to operate opposing sides of the tonneau cover 16, thereby ensuring proper alignment of the tonneau cover 16 during opening and closing.

As discussed further below, the motors 40 may be in communication with a cable connected to the tonneau cover 16. As a result, the motors 40 may directly or indirectly engage the cable to drive movement of the tonneau cover 16 during operation. The cable may be housed within a tube and routed along the canister body 24A using a plurality of clamps 52 to secure the tube, and thus the cable, to the canister body 24A.

Figure 5:
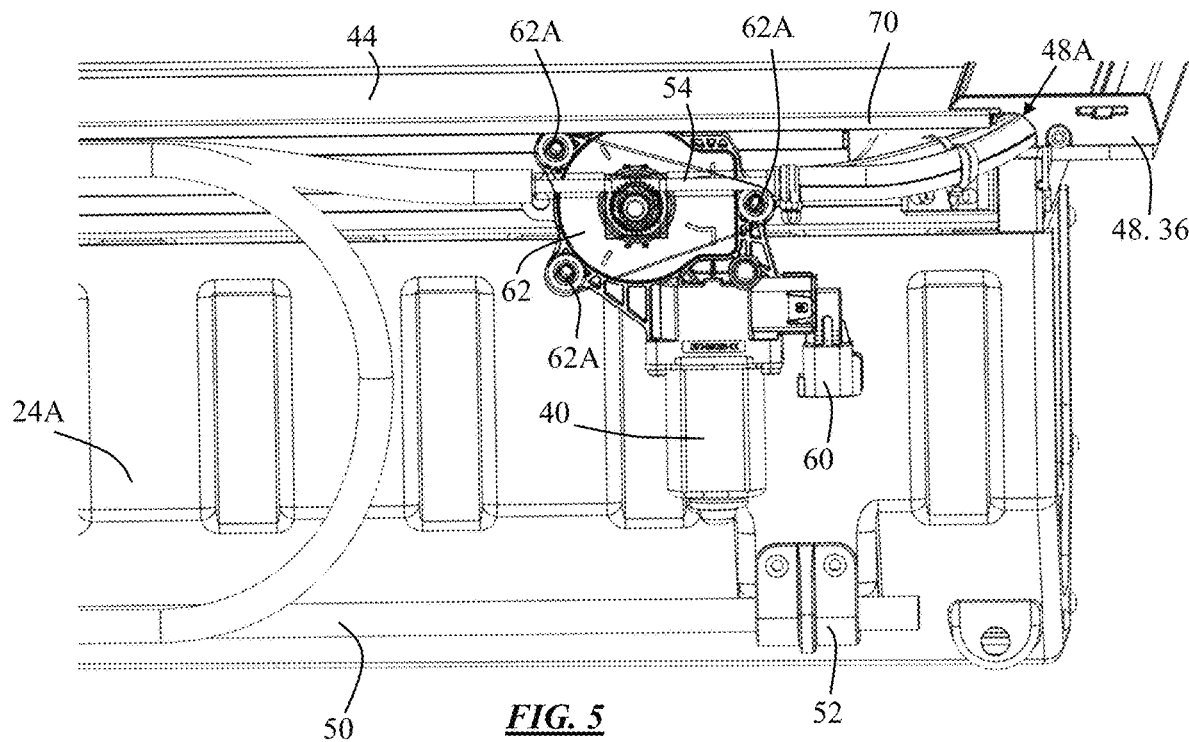
FIG. 5 is close-up view 5 of the tonneau cover of FIG. 4.

FIG. 5 illustrates close-up view 5 of the motor 40 shown in FIG. 4. As shown, the motor 40 may be mounted at least partially below the front panel 44 and the weatherstripping 70 along the canister body 24A. However, it should be noted that the motor 40 may be mounted anywhere along the cargo box, the bulkhead, the tailgate, or a combination thereof based upon packaging constraints. Thus, it may be gleaned from the present teachings that the drive system herein advantageously allows for customization of packaging not found in conventional tonneau cover systems.

The motor 40 includes a connector 60 to receive a wire harness within the vehicle or cargo box that may power the motor for operation of the tonneau cover. The motor 40 may further include a saddle 62 (made transparent for simplicity in FIG. 5) that covers a drive gear and exposed portion of the cable 54 (see FIG. 6). The saddle 62 may be mounted to the motor 40 and/or the canister body 24A through one or more mounting holes 62A using one or more fasteners.

As discussed above, the cable 54 is housed within a tube 50 and routed along the canister 24 using a plurality of clamps 52 to secure the tube 50 and cable 54 to the canister 24. As shown, the tube 50 may be a plurality of pieces so the cable is exposed within the saddle 62 to allow engagement between the cable 54 and the drive gear of the motor 40 (see FIG. 6). Thus, the cable 54 may move within the tube 50 during operation of the tonneau cover while the tube 50 may remain substantially stationary during such operation.

Figure 7:
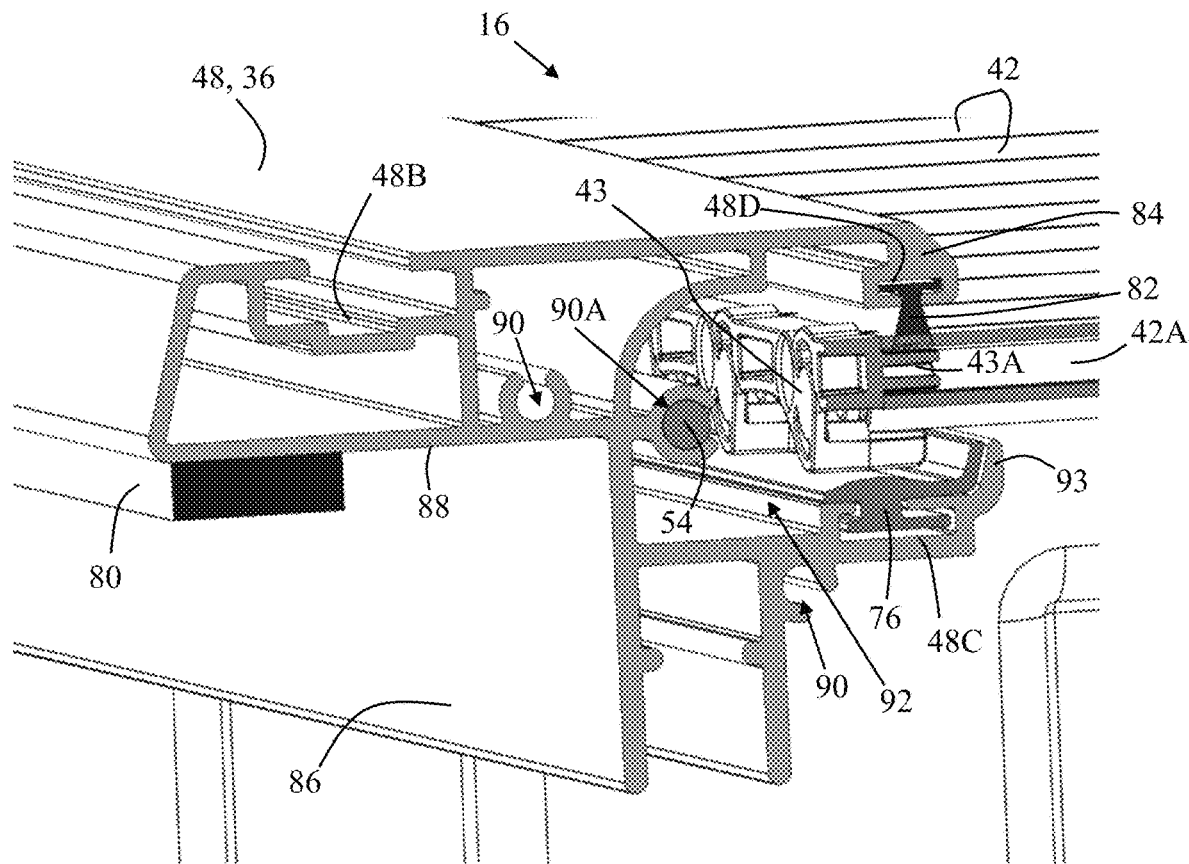
FIG. 7 is a cross-sectional view of a tonneau cover.
Figure 8:
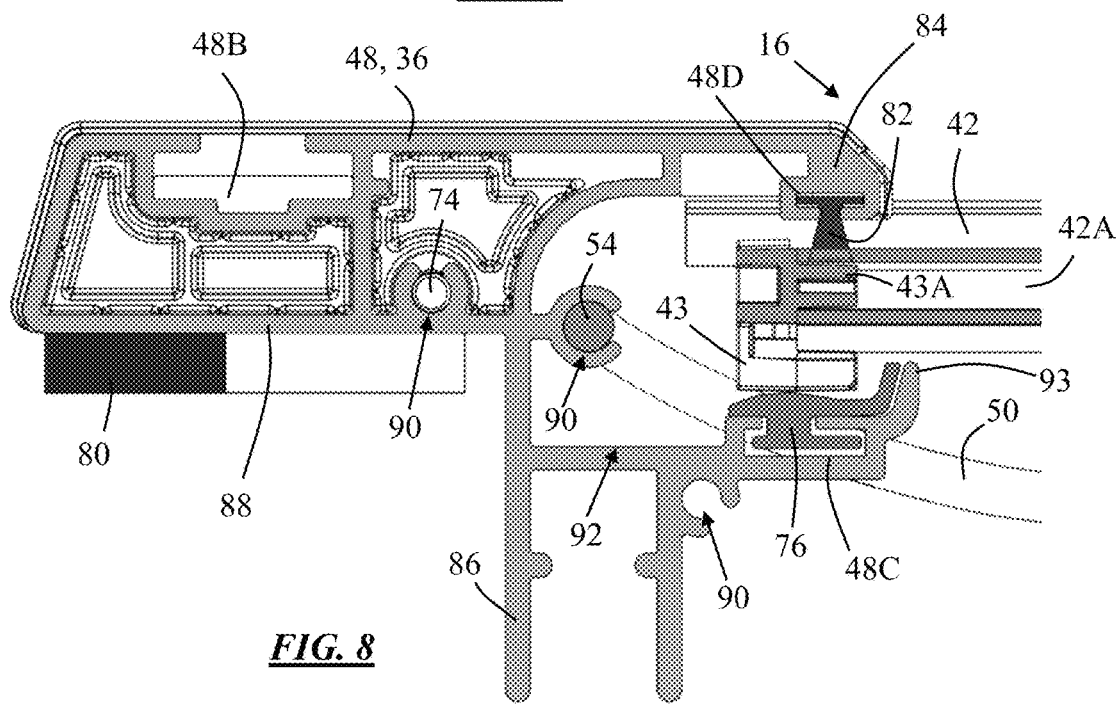
FIG. 8 is a cross-sectional view of a tonneau cover.

The cable 54 may also be routed into the side rails 48 of the tonneau cover through an opening 48A in the side rail 48 so that the cable 54 extends substantially along a length of the tonneau cover (see FIGS. 7 and 8). Therefore, the cable 54 may extend partially or entirely along the length of the tonneau cover so that, when the cable is secured to the slats and/or front panel of the tonneau cover, driving of the cable via the motor will result in movement of the tonneau cover along the side rails 48. Additionally, it should be noted that the side rails 48 as illustrated may be integrated with, or connected to, bed caps 36 of the cargo box.

Figure 6:
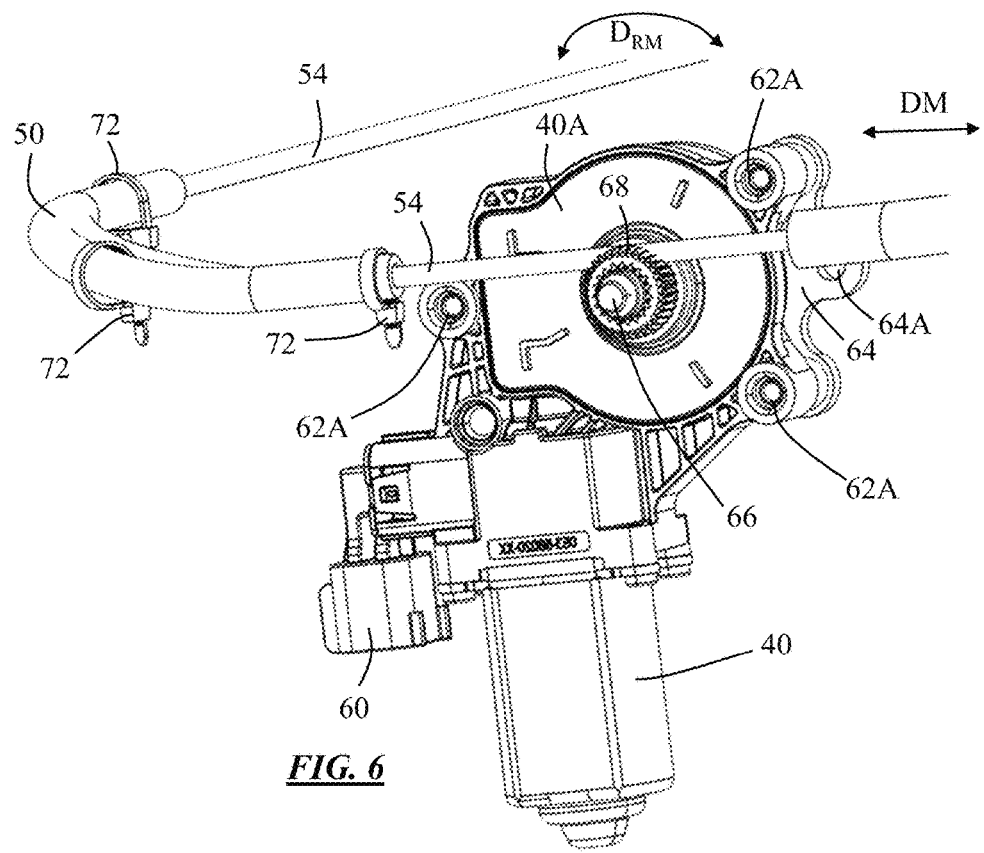
FIG. 6 is a perspective view of a motor engaged to a tonneau cover cable in accordance with the present teachings.

FIG. 6 is a close-up view of a motor 40 of the tonneau cover drive system in communication with a cable 54. The tonneau cover and canister have been removed for simplicity.

As discussed above, the motor 40 includes a connector 60 that connects to a wire harness to receive power to operate the motor 40. The motor 40 further includes a plurality of mounting holes 62A to secure the saddle (not shown) to the motor 40 and substantially cover the exposed portion of cable 54 outside of a housing 50 and a drive gear 66 of the motor 40.

As shown, the drive gear 66 includes teeth 68 that mesh with the cable 54. As the drive gear 66 is rotated in a direction ($D_R$), the teeth 68 engage the cable 54 and move the cable 54 in the direction (DM). Due to the cable 54 being routed through the tube 50 and connected to the tonneau cover, movement of the cable 54 in turn opens and closes the tonneau cover moving along the side rails of the tonneau cover. Additionally, as the cable 54 moves within the tube 50 during operation, a plurality of cable ties 72 ensure that the tube 50 remains closed around the cable 54.

Furthermore, the motor 40 may be connected to or include a mounting plate 64. The mounting plate may include one or more mounting holes 64A to secure the motor 40 and mounting plate 64 to a portion of the vehicle, cargo box, canister, or a combination thereof. It may also be noted that any number of motors 40 may be incorporated into the drive system. For example, while a pair of motors has been discussed above, a single centrally located motor 40 may also be implemented in such a drive system to drive opposing sides of the tonneau cover.

FIGS. 7 and 8 illustrate cross-sectional views of a tonneau cover 16 in accordance with the present teachings. The tonneau cover includes a plurality of slats 42 extending between opposing side rails 48. The opposing side rails 48 may be connected to, or integrated with, bed caps 36 of a cargo box.

One or more (e.g., substantially all) of the slats 42 may include an end cap 43. The endcaps 43 may be in connection with each other to ensure communication between slats 42 during operation. That is, the end caps 43 and other portions of the slats 42 may be interconnected to move the slats 42 in a substantially simultaneous manner during opening and closing of the tonneau cover 16. The end caps 43 may be secured to the slats 42 be an end cap projection 43A extending into a channel 42A of the slat 42. The projections 43A may be secured within the channels 42A using one or more fasteners, one or more adhesives, or both. Conversely, the projections 43A may be secured within the channels 42A using a press-fit condition free of fasteners, adhesives, or both.

The end caps 43 may be positioned within an opening 92 of the side rail 48 so that the end caps 43 rest along wear strip 76 located within the opening 92. The wear strip may be secured within the opening 92 by engaging a wear strip slot 48C located in the opening 92. Advantageously, the end caps 43 may allow for the slats 42 to substantially "float" above a lip 93 of the opening 92, thereby allowing for easier movement of the slats 42 during opening and closing of the tonneau cover 16.

The side rail 48 includes a mounting portion 86 and a support portion 88 substantially perpendicular to each other.

The mounting portion 86 may be configured to mount the side rail to the cargo box of a vehicle. For example, the mounting portion 86 may be secured directly to an inner side panel of the cargo box, an upper edge of the cargo box, or both. Thus, the mounting portion 86 may secure the side rail 48 while the support portion 88 further supports the side rail 48 when mounted. However, it is also envisioned that the support portion 88 may also secure the side rail 48 to the cargo box. Additionally, a spacer 80 may be positioned between the support portion 88 and an upper edge of the cargo box. The spacer 80 may be compressible or otherwise moveable to ensure proper mounting of the side rail 48.

The side rail 48 further includes an overhang portion 84. The overhang portion 84 may be configured to extend over the slats 42 and inward toward a central portion of the cargo box to substantially protect the end caps 43 and terminal ends of the slats 42. To further protect the end caps 43 and opening 92 of the side rail 48, a seal 82 may be secured within a seal slot 48D of the overhand portion 84. The seal 82 may brush again or otherwise contact an upper surface of the slats 42 inward from, and adjacent to, the end caps 43. As a result, the seal 82 may ensure moisture and debris do not reach the opening 92 and degrade the end caps 43, wear strip 76, other components, or a combination thereof.

As further discussed above, the tonneau cover 16 may be automated so that the slats 42 are electronically moved from and open position to a close position, vice versa, or one or more positions in between. The opening and closing of the tonneau cover 16 may guide the end caps 43 longitudinally along the wear strip 76 to extend and/or retract the slats 42. To move the interconnected slats 42 from the open position to the close position, and vice versa, a motor in communication with a cable 54 engages the cable 54—directly or indirectly. The cable 54, connected to one or more slats 42 or panels (e.g., the front panel) of the tonneau cover 16, in turn moves the slats 42 and/or panels along the side rails 48 (e.g., the wear strip 76). To facilitate such engagement, the cable 54 may be routed through a channel 90, such as a cable channel 90A, to extend along the side rail 48 within the opening 92 of the side rail. It should be noted that a plurality of channels 90 may be present along the side rail for various electrical connections, wires, additional cables and/or componentry, fasteners 74, or a combination thereof. Beneficially, the cable channel 90A may ensure that the cable 54 extends substantially parallel to a direction of movement of the tonneau cover 16 during operation (i.e., the cable 54 may extend in a direction substantially perpendicular to a length of the slats 42). It is also envisioned that the cable 54 may be located within a tube 50 when routed through the cable channel 90A. Alternatively, the cable 54 may be free of the tube 50 within the cable channel 90A.

Furthermore, the side rail 48 may include one or more additional slots 48B configured for one or more additional accessories. For example, the slot 48B may secure secondary items to the side rails, such as a vehicle rack for transporting one or more items, a headache rack secured near a vehicle cab, one or more secondary lights, or a combination thereof. Thus, the tonneau cover 16 may provide even further customization.

Figure 9:
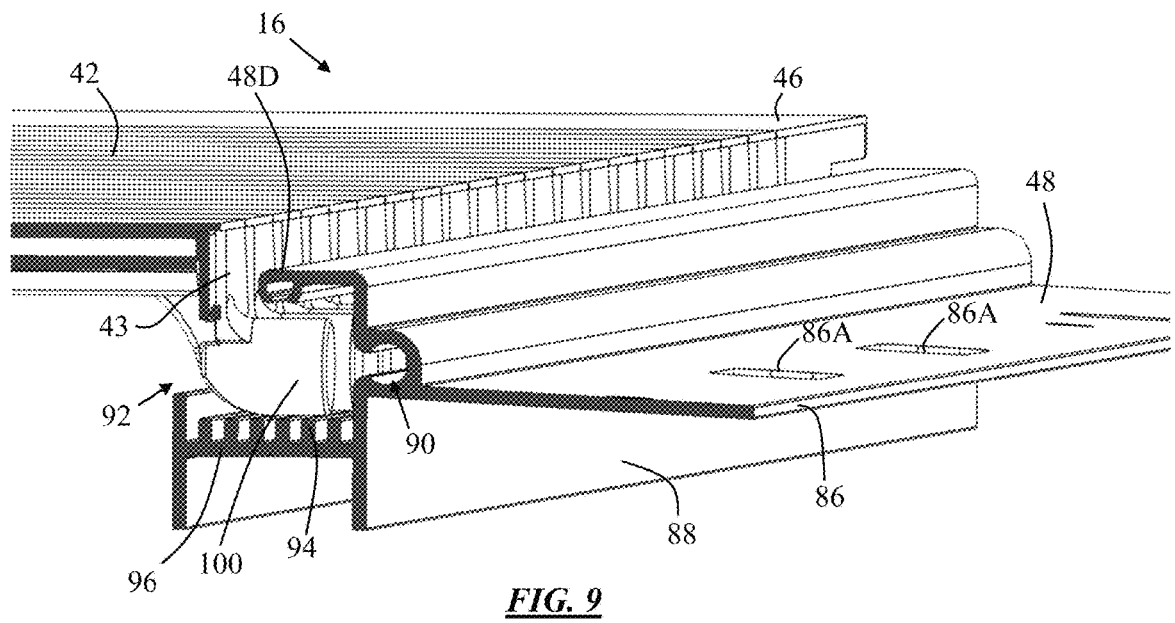
FIG. 9 is a cross-sectional perspective view of a tonneau cover.
Figure 10:
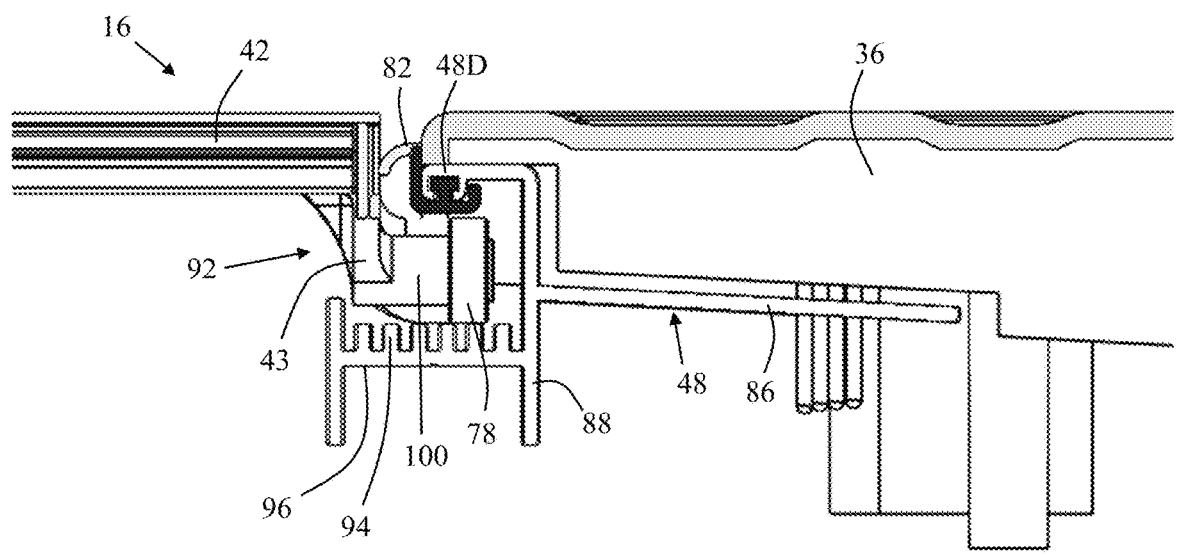
FIG. 10 is a cross-sectional view of a tonneau cover.

FIGS. 9 and 10 illustrate cross-sectional views of an alternative tonneau cover 16 configuration. While certain configuration features discussed herein may be shown in only a portion of the figures, the present teachings provide for a combination of one or more features from one or more differing figures. For example, elements shown in FIGS. 9 and 10 may be combined, or used in lieu of, features shown in FIGS. 7 and 8.

The tonneau cover 16 of FIGS. 9 and 10 includes a plurality of slats 42 extending between side rails 48 of the tonneau cover 16. The side rails 48 may be integrated with bed caps of the cargo box as discussed above. Alternatively, the side rails 48 may include one or more mounting holes 86A of a mounting portion 86 of the side rail 48 to secure the side rail 48 to an upper edge or lip of the cargo box. Additionally, a supporting portion 88 may then abut an inner side panel of the cargo box to further ensure positioning of the side rail 48 and prevent movement of the side rail 48 once secured. Once secured, a bed cap 36 may then be secured to the side rail 48 using the mounting holes 86A or additional securing mechanisms.

As shown above in FIGS. 7 and 8, the side rail 48 may at least partially overhang the slats 42 so that the slats 42 are slightly recessed from an upper surface of the side rails 48 or bed caps. Alternatively, as shown in FIGS. 9 and 10, the side rail 48 may be free of overhang covering the slats 42 except for one or more extensions 100 extending from end caps 43 of the slats 42. As a result, the slats 42—and thus the tonneau cover 42—may create a substantially flush surface with an outer surface of the bed caps 36 (see FIG. 10). Similarly, an outer surface of the slats 42 may extend outwardly beyond an upper surface of the side rails 48. Additionally, while a substantially flush surface between the tonneau cover 16 and the bed caps 36 is portrayed, it is also envisioned that the slats 42 may also protrude beyond an upper surface of the bed cap 36.

As discussed above, the end caps 43 of the slats 42 may include an extension 100 that extends into an opening 92 of the side rail 48. The extensions 100 may rest along one or more ribs 94 projecting from a lower support surface 96 of the opening 92. Alternatively, the extensions 100 may include a bearing 78 that rests along the ribs 94 so that, during movement of the tonneau cover 16, the bearings 78 are guided along the ribs 94 to open and/or close the tonneau cover 16.

The tonneau cover 16 as described in FIGS. 9 and 10 may also be driven by an automated drive system as discussed above. That is, the tonneau cover 16 may be driven by a motor and cable system to open and close the tonneau cover 16. Therefore, it may be gleaned from the present teachings that the drive systems and tonneau covers 16 described herein may be selectable to provide the most beneficial packaging and operation. For example, the tonneau cover 16 shown in FIGS. 9 and 10 may be driven by the drive system illustrated in FIG. 4. Similarly, the tonneau cover 16 shown in FIGS. 7 and 8 may also be driven by the drive system illustrated in FIG. 4. Moreover, the tonneau covers 16 shown in FIGS. 7-10 may be driven by additional drive systems, such as those discussed below in regards to FIG. 13-17.

The tonneau cover 16 shown in FIGS. 9 and 10 may also include one or more seals 82 secured within a seal slot 48D of the side rail 48. The seal 82 may extend inward towards to the end caps 43 of the slats 42 to seal a gap between the side rail 48 and the send caps 43, thereby preventing debris and moisture from entering the opening 92 of the side rail 48.

Figure 11:
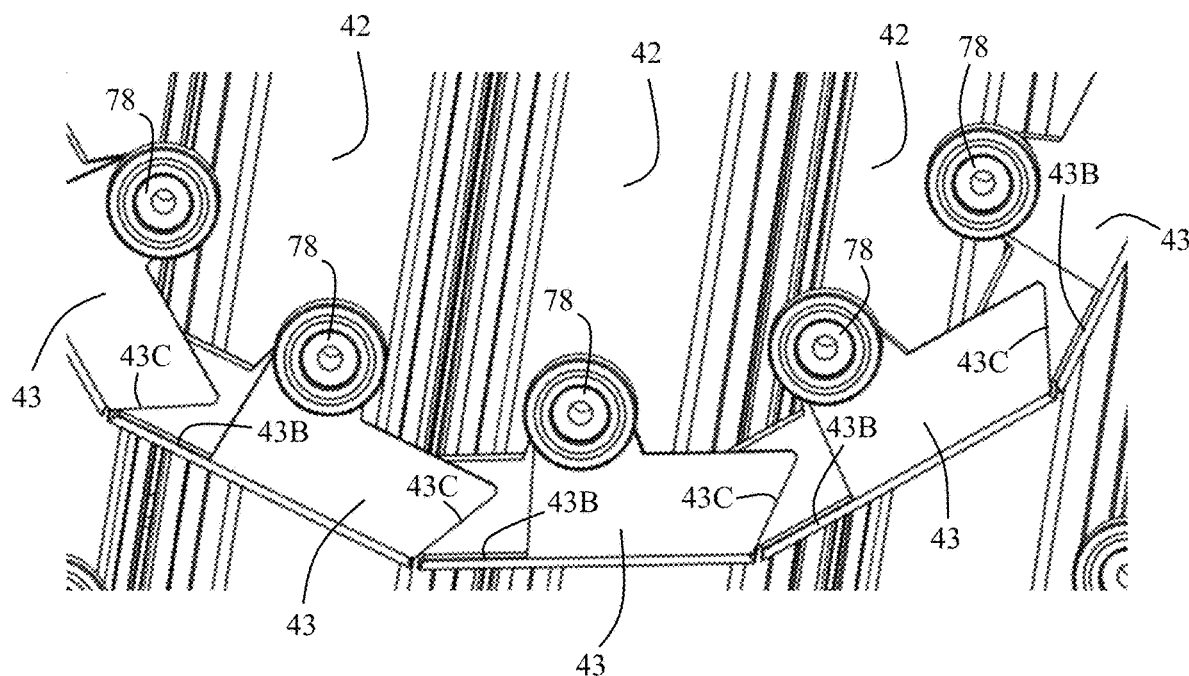
FIG. 11 is a close-up view of slats of a tonneau cover.

FIG. 11 illustrates a plurality of interconnected slats 42 of the tonneau covers when the tonneau cover is in an open or semi-opened position. As detailed above, in an open or semi-opened position, the slats 42 are retracted into a canister or false bulkhead where the slats 42 may be rolled or bent relative to one another.

As shown, the slats 42 include an end cap 43. The end caps 43 each include an edge 43C and a lip 43B. As the slats 42 are guided along side rails by the bearings 78 secured to the end caps 43, the slats 42 may bend relative to one another. During this bending, an edge 43C of one end cap 43 may engage a lip 43B of another end cap 43. Beneficially, such engagement may prevent overextension or overbending of one slat 42 relative to another slat 42. That is, the engagement between the edge 43C of one slat 42 with the lip 43B of another slat 42 may act as a stop when the slats 42 move relative to each other.

The edge 43C of each slat 42 may extend at any desired angle relative to the lip 43B of that same slat 42. For example, the edge 43C and lip 43B may form an angle of about 30 degrees or more, about 45 degrees or more, or about 90 degrees or more. The edge 43C and the lip 43B may form an angle of about 150 degrees or less, about 120 degrees or less, or about 100 degrees or less.

Additionally, to receive the edge 43C of an adjoining end cap 43, each end cap 43 may include a notch 43D that is recessed from the surface of the end cap 43 to ensure the edge 43C of the adjoining end cap 43 engages the lip 43C of the end cap 43.

Figure 12:
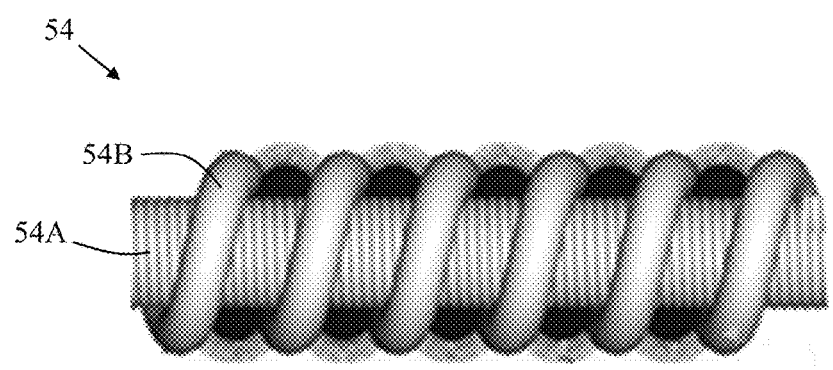
FIG. 12 is a close-up view of a cable for a tonneau cover in accordance with the present teachings.

FIG. 12 illustrates a close-up view of a cable 54 that may be utilized with the drive systems of a tonneau cover as described above. The cable 54 may be a helical cable, whereby the cable 54 includes a core 54A surrounded by a helical coil 54B wrapped around the core 54A. During operation of the tonneau cover, the drive gear of the motor may engage the cable 54 by meshing teeth of the drive gear with the coil 54B of the cable 54 (see FIG. 6). Due to the geometry of the coil 54B, the cable 54 may be advanced along the drive gear, thereby moving the connected tonneau cover in a desired direction.

It should also be noted that other cable configurations may be utilized other than a helical cable. For example, a notched or grooved cable may also be utilized to engage the drive gear. Similarly, a coil 54B other than helical in shape may also facilitate movement of the tonneau cover using the drive systems described above.

Figure 13:
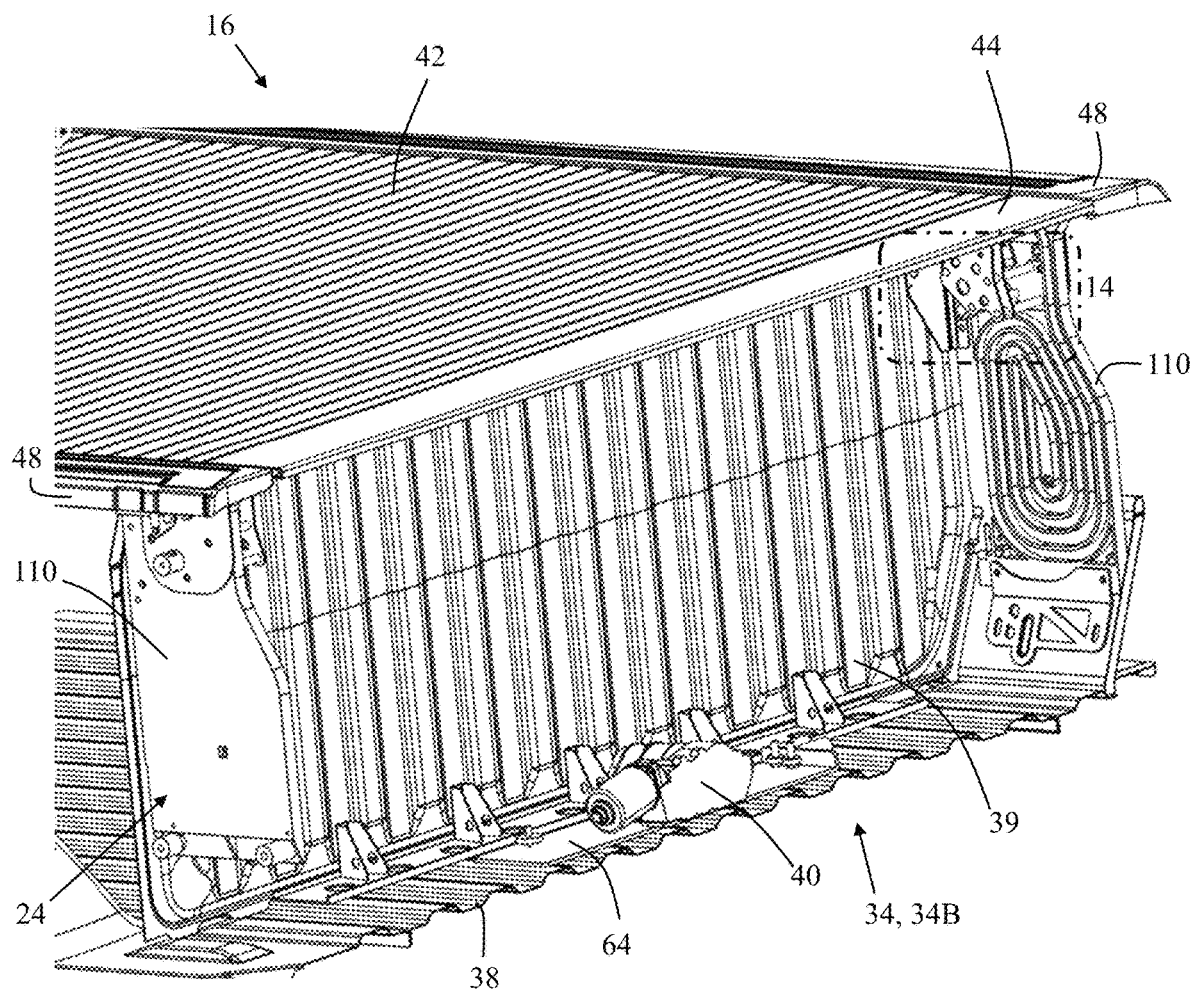
FIG. 13 is a perspective view of a tonneau cover drum drive system having a motor positioned within a false bulkhead of a cargo box of a vehicle.

FIG. 13 illustrates a perspective view of a drive system 34 of a tonneau cover 16. As shown, the tonneau cover 16 includes a plurality of interconnected slats 42 extending between opposing side rails 48. The slats 42 may be configured to move along the side rails 48 and enter a canister 24 formed by opposing track panels 110 and a bulkhead panel 39. As discussed above, the bulkhead panel 39 may be a false panel 39 that creates that canister 24 as a hidden compartment within the cargo box while the cargo box visually looks to be unaltered.

During opening of the tonneau cover 16, the slats 42 may be driven by a motor 40 of the drive system 34 so that the slats 42 enter the canister 24 and are guided along the track located on the opposing track panels 110, thereby partially or entirely hiding the tonneau cover 16. Moreover, as the end caps may be integrated with the side rails 48, when the tonneau cover is fully opened, the cargo box of the vehicle may look unchanged.

To drive the slats 42 into the canister 24, or vice versa, the front panel 44 located above the canister 44 may articulate open to allow ingress and egress of the slats 42 into and from the canister 44. When the tonneau cover 16 is in a fully open or fully closed position, the front panel 44 may articulate closed to seal of and cover the canister 24 (see FIGS. 20 and 21).

The motor 40 of the drive system 34 may be mounted to the floor 38 of the cargo box within the canister (i.e., within the false bulkhead). Advantageously, this ensures that the elements of the drive system 34 remain hidden from view for a user of the vehicle. The motor 40 may be mounted to the floor 38 via a mounting plate 64. However, it should be noted that the motor 40 may be mounted anywhere along the cargo box or canister based on packaging and/or configuration needs.

Figure 14:
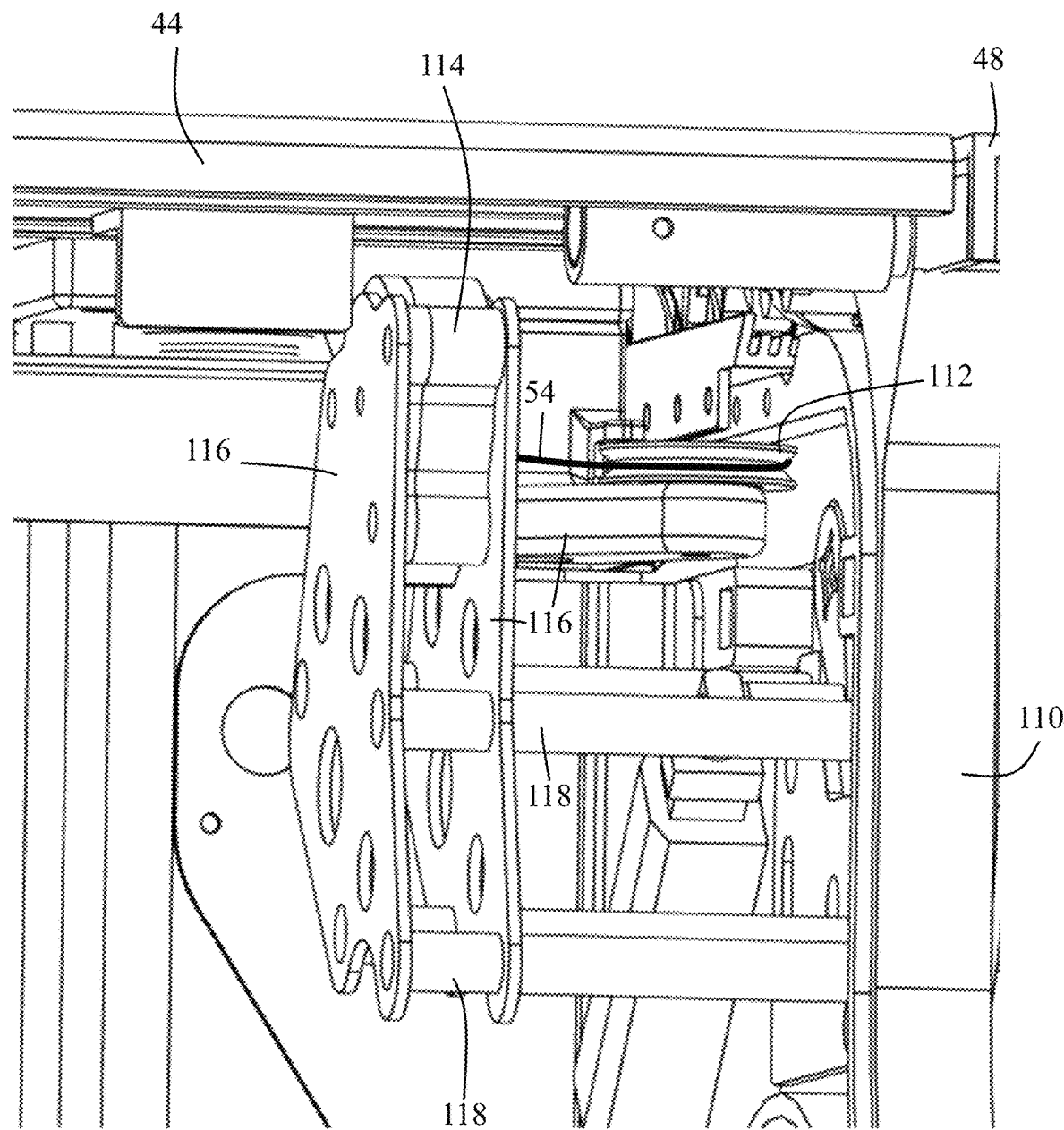
FIG. 14 is a close-up view 14 of FIG. 13 showing pulley configuration of the drum drive system of the tonneau cover.

FIG. 14 illustrates close-up view 14 of the drive system 34 shown in FIG. 13. As shown, the drive system 34 may be a drum drive system 34B. As discussed above, the drive system 34 may include a motor 40 positioned within the false bulkhead of a cargo box to drive the tonneau cover 16. To facilitate such movement, the motor 40 may be in communication with a cable 54 (a portion of which is shown in FIG. 14). The cable 54 may extend from or through the motor 40 and may further be routed into the side rails 48 to secure the cable 54 to the slats or panels (i.e., a rear panel) of the tonneau cover 16 to move the tonneau cover 16 between an open position and a closed position.

The cable 54 may be routed through one or more pulleys 112 to ensure proper movement of the cable 54 during operation. The pulleys 112 may be mounted in any desired position at any desired angle. For example, the pulleys 112 may be mounted to the track panels 110 by one or more mounting brackets 116 and may at least partially be positioned underneath the front panel 44. Similarly, the mounting brackets 116 may secure a pulley housing 114 that houses one or more pulleys 112 in communication with the cable 54. Similarly the pulleys 112, the pulley housing 14, or a combination thereof may be offset from the track panel 110 or any other portion of the tonneau cover 16 by one or more pegs 118. As such, it may be gleaned from the present teachings that the drive system 34 can be configured for various routing of the cable 54.

Figure 15:
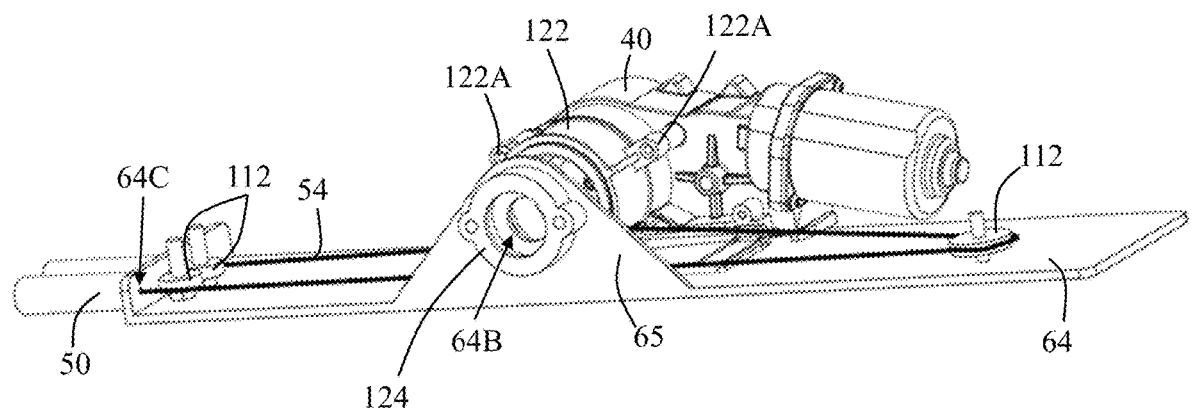
FIG. 15 is a perspective view of a motor for a tonneau cover.

FIG. 15 is a perspective view of a motor 40 for the drum drive system discussed above. The motor 40 may secured to the floor of the cargo box by a mounting plate 64. The motor 40 may also include a drum positioned within a drum cover 122 secured to the motor 40 by one or more fasteners (not shown) extending through the mounting holes 122A of the drum cover 122. An aperture of the drum (not shown) may align with a through hole 64B located on a projection 65 of the mounting plate 65. Similarly, a mounting plate cap 124 may also include a through-hole aligned with both the hole of the drum and the through hole 64B of the projection 65 of the mounting plate 65.

During operation of the tonneau cover, a cable 54 may extend through an opening 64C in the mounting plate 64 to route the cable 54 through the canister, the one or more side rails, or both, and connect the cable 54 to one or more slats and/or panels of the tonneau cover, thereby facilitated movement of the tonneau cover based upon driving of the motor 40. The cable may be routed at least partially through one or more tube 50 encompassing the cable 54. However, it should be noted that portions of the cable 64 engaging the drum of the motor 54 may be positioned outside the tubes 50. The cable 54 may be routed through one or more pulleys 112 located along the mounting plate 64 to align the cable with the drum of the motor 40.

Figure 16:
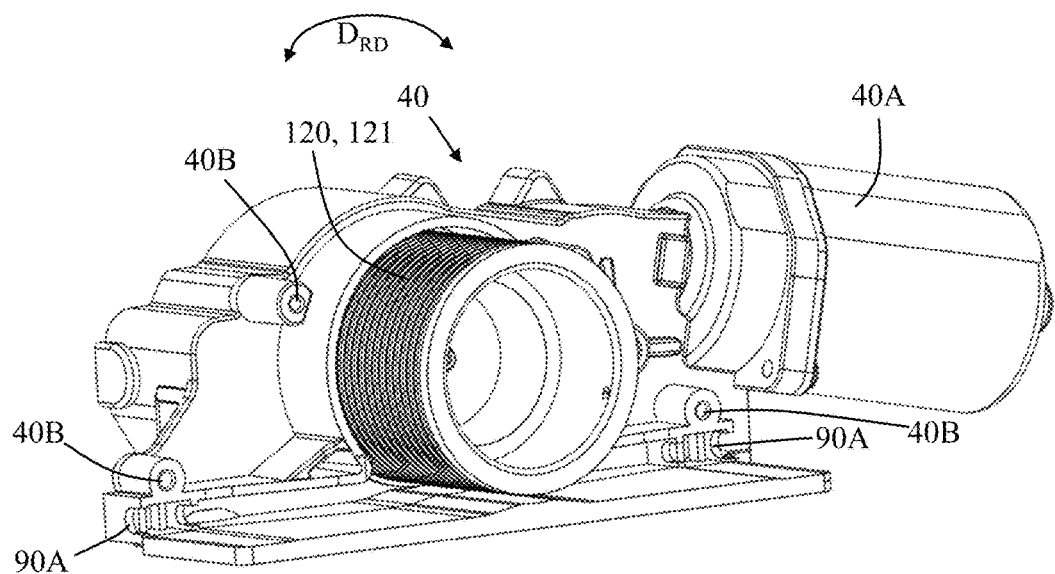
FIG. 16 is a perspective view of the motor of FIG. 15 with a drum cover removed.

FIG. 16 illustrations a perspective view of the motor 40 of FIG. 15 with the drum cover 122 removed. The drum cover (not shown) may be mounted to one or more mounting holes 40B along the motor housing 40A of the motor 40 using one or more fasteners (not shown). The motor 40 may also include one or more cable channels 90A to align the cable (not shown) with threading 121 along the drum 120. The motor 40 may drive the drum 120 to rotate in the direction ($D_{RM}$). As the drum 120 rotates, the cable engages the threading 121 of the drum 120 and begins to wrap the cable along the drum 120. The cable in turn pulls the slats of the tonneau cover along the side rails, thereby opening and/or closing the tonneau cover.

Figure 17:
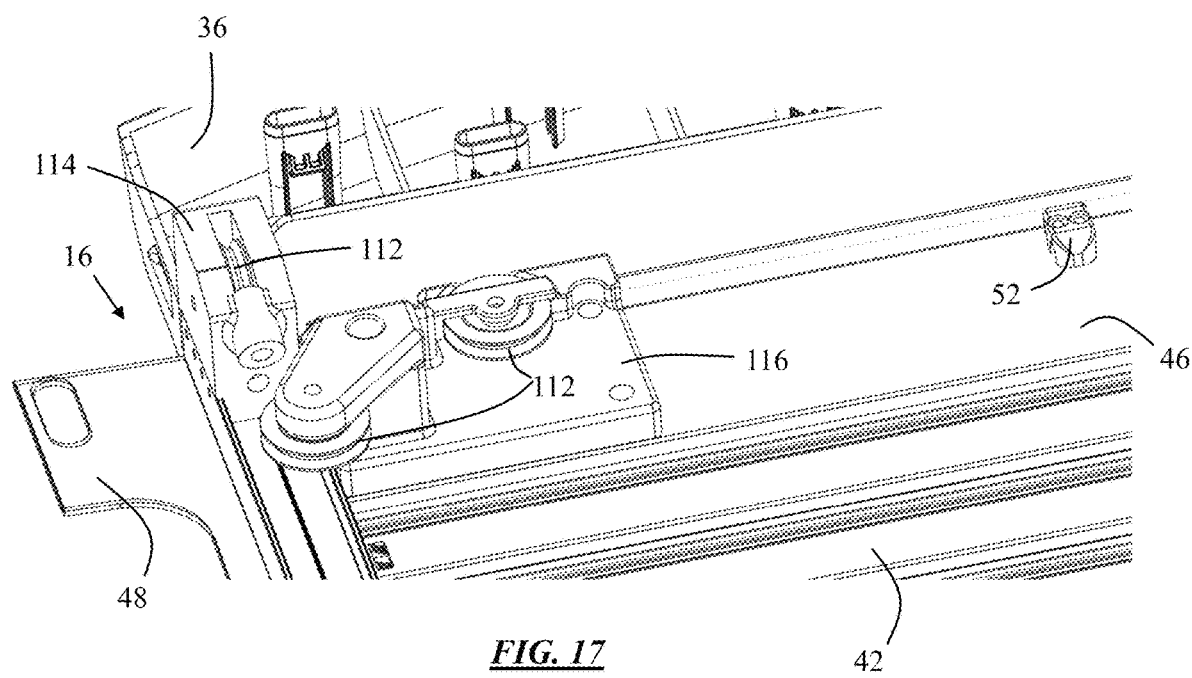
FIG. 17 is a close-up view of the drive system of a tonneau cover near the rear panel of the tonneau cover.

FIG. 17 illustrates a close-up view of a plurality of pulleys 112 in communication with a cable (not shown). As shown, a plurality of pulleys 112 may be mounting to the side rail 48 or rear panel 46 of the tonneau cover 16 using one or more mounting brackets 116. Similarly, one or more of the pulleys 112 may be at least partially enclosed within a pulley housing 114 to further ensure proper routing of the cable and preventing disengagement of the cable from the pulleys 112. Additionally, one or more clamps 52 may be positioned along the rear panel 46 to secure the cable and or a tube enclosing the cable (not shown).

The pulleys 112 and the clamps 52 may be secured along an underside of the tonneau cover 16 and side rails 48 so that, as the motor drives the cable, the cable in turn moves the slats 42 and the rear panel 46 of the tonneau cover 16 between the open and closed positions, or vice versa.

Figure 18:
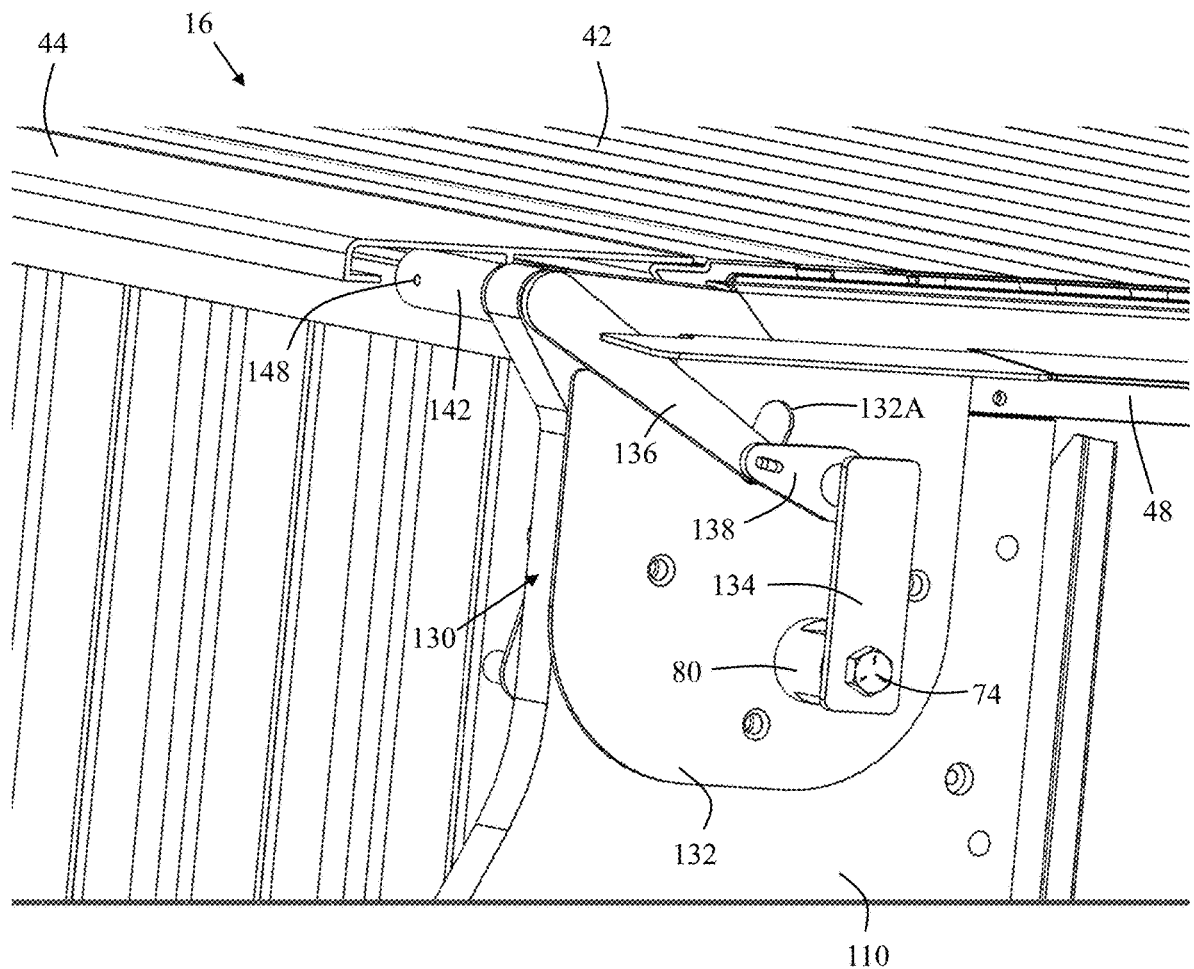
FIG. 18 is an exterior perspective view of an actuator assembly of a front panel of a tonneau cover.

FIG. 18 illustrates an exterior perspective view of an actuator assembly 130. The actuator assembly 130 may be configured to actuate a front panel 44 of a tonneau cover 16 between an open and closed position, a position between the open and closed positions, or a combination thereof (see FIGS. 20 and 21). It is envisioned that the front panel 44 may actuate between an open and closed position to allow slates 42 and/or panels of the tonneau cover 16 to enter the canister partially defined by opposing track panels 110.

The actuator assembly 130 may be mounted to the track panel 110 of the canister that receives the slats 42 and/or panels of the tonneau cover 16 during opening of the tonneau cover 16. Similarly, the actuator assembly 130 may be at least partially mounted, in communication with, or located adjacent to, one or more side rails 48 of the tonneau cover 16.

The actuator assembly 130 may include a mounting plate 132 for securing one or more components of the actuator assembly 130 to the track panel 110. To actuate the front panel 44, a driveshaft (not shown) extending into a barrel 142 of the front panel 44 is secured to the barrel 142 by extending a pin or clip through a pin hole 148 located along the barrel 142. Similarly, it is envisioned that the barrel 142 may engage the driveshaft of the actuator assembly 130 in a press-fit condition.

An actuator of the actuator assembly 130 may communicate with a crank 138 to move the crank and/or a connecting link 136 along a slot 132A of the mounting plate 132. Such movement of the link 136 in turn drives the driveshaft, thereby rotating the barrel 142 along a central axis of the barrel 142.

Additionally, the actuator assembly 130 may include a stake pocket plate 134 secured to the mounting plate 132 by a fastener 74 extending through a spacer 80 and into the mounting plate 132. The stake pocket plate 134 may be configured to secure the actuator assembly 130 at least partially to the cargo box via one or more stake pockets along an upper edge or lip of the cargo box. The stake pocket plate 134 may be adjustable or moveable to facilitate connection to or within the stake pockets of the cargo box, thereby secured the actuator assembly 130 during actuation of the front panel 44.

Figure 19:
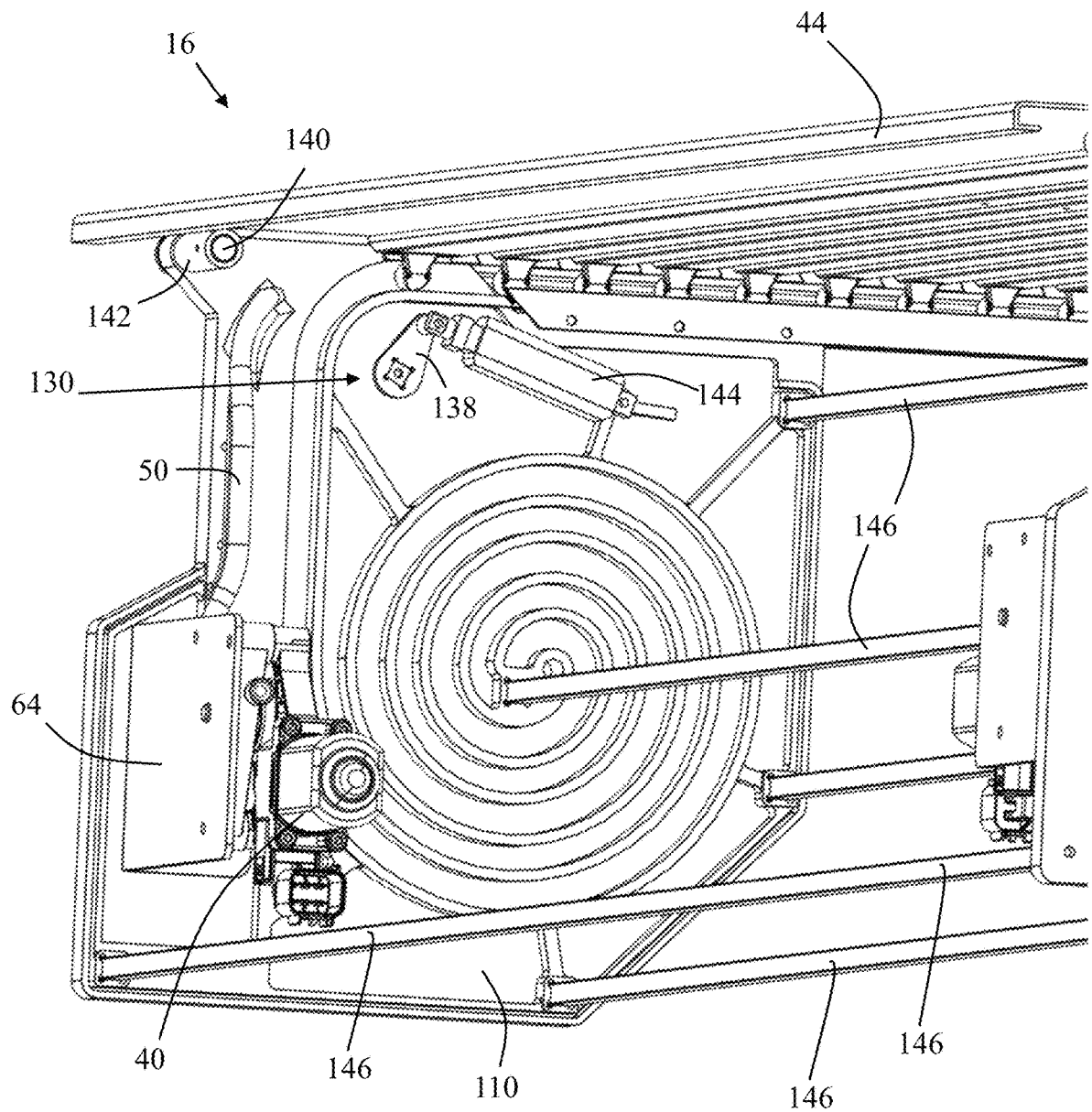
FIG. 19 is an interior perspective view of the actuator assembly of FIG. 18.

FIG. 19 illustrates an interior perspective view of the actuator assembly 130 shown in FIG. 18. As discussed above, the striker assembly 130 includes a driveshaft 140 secured within a barrel 142 of the front panel 44 of the tonneau cover 16. The driveshaft 140 may be in direct or indirect communication with an actuator 144 of the actuator assembly 130 to actuate the front panel 44 between an open and closed position (see FIGS. 20 and 21). For example, the actuator 144 may be mounted along an interior side of the track panel 110 so that a driving or actuating portion of the actuator 144 is connected to the crank 138. Thus, actuator of the actuator 144 may drive the crank 138 to rotate, thereby moving a link connected to the driveshaft 140. As a result, the driveshaft 140 is rotated due to movement of the link, thereby rotating the barrel 142 of the front panel 44 and articulating the front panel 44 based on rotation of the barrel 142 about a center axis of the barrel 142.

It is envisioned that a single actuator 144 or a plurality of actuators 144 may be utilized to articulate the front panel 44. For example, a pair of actuators 144 may be mounted on opposing track panels 110 so that a pair of actuator assemblies 130 articulate opposing sides of the front panel 44. However, a single actuator assembly 130 may also be utilized to articulate the entirety of the front panel 44.

Additionally, as shown in FIG. 19, the motor 40 and mounting plate 64 of the motor 40 utilized in the drive system of the tonneau cover 16 may also be positioned along the same track panel 110 within the canister of the tonneau cover 16. Advantageously, the present tonneau cover 16 may provide for optimized packaging, whereby both portions or all of the drive system—including the motor 40 and portions of the cable housed within a tube 50—and the actuator assembly 130 may be contained within the canister of the tonneau cover 16. Furthermore, the various assemblies may be secured to the track panels 110 and reinforced by one or more additional supports 146 extending between opposing track panels 110 of the canister.

Figure 20:
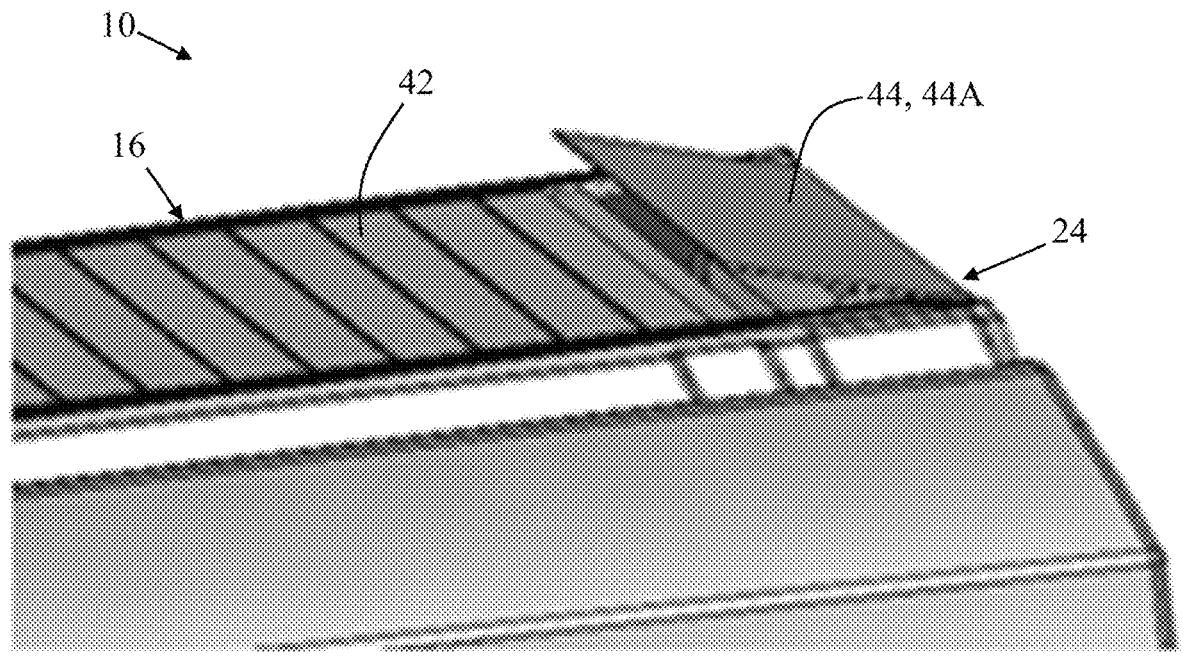
FIG. 20 is a perspective view of a front panel of a tonneau cover in an open position.
Figure 21:
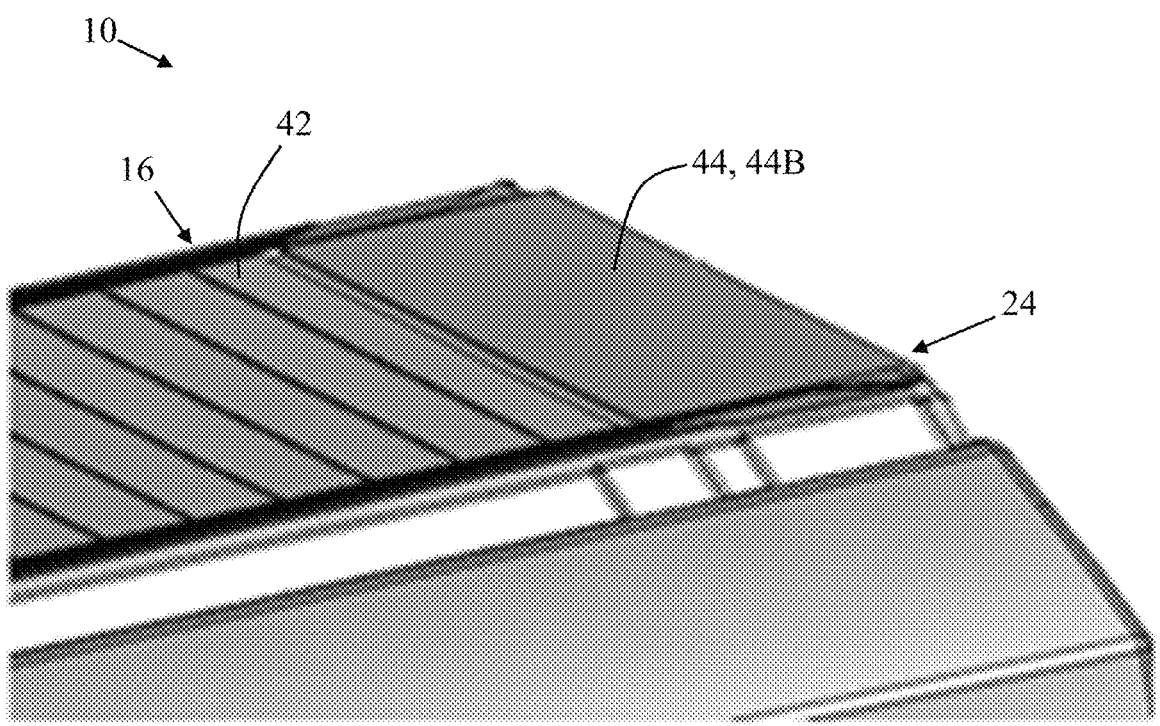
FIG. 21 is a perspective view of the front panel of FIG. 20 in a closed position.

FIGS. 20 and 21 illustrate a perspective view of a front panel 44 of a tonneau cover 16 of a vehicle 10 having one or more actuator assemblies as described above. In FIG. 20, the front panel is in an open position 44A to allow one or more slats 42 to enter a canister 24 located beneath the front panel 44.

Similarly, in FIG. 21, the front panel 44 is in a closed position 44B, whereby the front panel 44 is closing the canister 24 and sealing the canister 24 from debris and moisture. The front panel 44 may be in the closed position 44B when the tonneau cover 16 is an open position or a closed position. Additionally, the front panel 44 may be in an open position 44A when the tonneau cover 16 is in an open position, a closed position, one or more positions therebetween, or a combination thereof. Thus, the front panel 44 may ensure proper closure of the canister 24 during operation of the tonneau cover.

While the front panel 44 is described above with respect to having an actuator assembly, it is envisioned that one or more actuator assemblies may also be utilized with one or more additional panels of the tonneau cover 16, such as a rear panel of the tonneau cover 16 adjacent to, or in contact with, the tailgate of a cargo box. Thus, the actuator assembly may also beneficially articulate the rear panel between an open position where the tailgate may be opened and closed free of contact or encumbrance from the rear panel, to a closed position where the rear panel is in contact with or adjacent to the tailgate, thereby sealing the interior of the cargo box. As such, one may glean from the present teachings that the actuator assembly may be integrated into one or more additional locations within the cargo box and/or the tonneau cover 16 to facilitate additional movement of the tonneau cover 16.

ELEMENT LIST

10 Vehicle
12 Cargo Box
14 Tailgate
16 Tonneau Cover
18 Top Edge of the Cargo Box
20 Inside of the Cargo Box
22 Top Edge of Tailgate
24 Canister
24A Canister Body
24B Canister Side Panel
28 Inside Panel
30 Outer Fender
32 Sensor
34 Drive System
34A Gear Drive System
34B Drum Drive System
36 Bed Cap
38 Floor
39 Bulkhead Panel
40 Motor
40' First Motor
40" Second Motor
40A Motor Housing
40B Motor Mounting Hole
42 Slat
42A Slat Channel
43 Slat End Cap
43A End Cap Projection
43B End Cap Lip
43C End Cap Edge
43D End Cap Notch
44 Front Panel
44A Front Panel Open Position
44B Front Panel Closed Position
46 Rear Panel
48 Side Rail
48A Opening in the Side Rail
48B Slot of the Side Rail
48C Wear Strip Slot of the Side Rail
48D Seal Slot of the Side Rail
50 Tube
52 Clamp
54 Cable
54A Cable Core
54B Cable Coil
60 Connector
62 Saddle
62A Saddle Mounting Hole
64 Mounting Plate
64A Mounting Plate Mounting Hole
64B Mounting Plate Through Hole
64C Mounting Plate Opening
65 Mounting Plate Projection
66 Drive Gear
68 Teeth of the Drive Gear
70 Weatherstripping
72 Cable Tie
74 Fastener
76 Wear Strip
78 Bearing
80 Spacer
82 Seal
84 Overhang Portion
86 Mounting Portion
86A Mounting Portion Mounting Hole
88 Support Portion
90 Channel
90A Cable Channel
92 Opening 93 Lip
94 Rib
96 Support Surface
100 Extension
110 Track Panel
112 Pulley
114 Pulley Housing
116 Mounting Bracket of the Pulley
118 Peg
120 Drum
122 Drum Cover
122A Drum Cover Mounting Hole
124 Mounting Plate Cap
130 Actuator Assembly
132 Actuator Assembly Mounting Plate
132A Mounting Plate Slot
134 Stake Pocket Plate
136 Link
138 Crank
140 Driveshaft
142 Barrel
144 Actuator
146 Support
148 Pin Hole
$D_O$ Direction of Opening of the Tonneau Cover
$D_R$ Direction of Retraction of the Tonneau Cover
$D_{RM}$ Direction of Rotation of the Motor
$D_{RD}$ Direction of Rotation of the Drum The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

The disclosures of all articles and references, including patent applications and publications, are incorporated by reference for all purposes. Other combinations are also possible as will be gleaned from the following claims, which are also hereby incorporated by reference into this written description.

What is claimed is:

1. A tonneau cover assembly configured to cover a cargo box of a vehicle, the tonneau cover assembly comprising:
   (a) opposing side rails configured to attach to opposing sides of the cargo box;
   (b) a tonneau cover comprising a plurality of connected slats extending between and supported by the opposing side rails;
   (c) a drive system configured to move the plurality of connected slats along the opposing side rails between an open position and a closed position; and
   (d) a rear slat or panel that is connected to the plurality of connected slats and is located adjacent to a tailgate of the vehicle when the tonneau cover is in the closed position;
   wherein the drive system comprises a motor in communication with a cable, and the cable is connected to only the rear slat or panel, the motor is configured to move the cable to pull the rear slat or panel away from the tailgate to move the plurality of connected slats into the open position, and the motor is configured to push the cable to push the rear slat or panel towards the tailgate to move the plurality of connected slats into the closed position.

2. The tonneau cover assembly of claim 1, wherein in the open position, the plurality of connected slats are retracted into a canister, the canister is located in a front region of the cargo box.

3. The tonneau cover assembly of claim 2, wherein the motor is located within the canister, wherein the cable is routed through the canister and extends into the opposing side rails to directly or indirectly connect to the rear slat or panel.

4. The tonneau cover assembly of claim 2, wherein the motor includes a drive gear that engages and moves the cable.

5. The tonneau cover assembly of claim 4, wherein the cable is a helical cable having a core and a helical coil wrapped around the core.

6. The tonneau cover assembly of claim 4, wherein the drive gear is housed within a saddle mounted to the drive gear, wherein the cable is at least partially housed within a tube, and the cable includes an exposed portion free of the tube to allow the cable to directly contact the drive gear.

7. The tonneau cover assembly of claim 1, wherein the opposing side rails are integrated with bed caps located along top edges of the cargo box.

8. The tonneau cover assembly of claim 7, wherein the drive system is controlled wirelessly by a remote device by a sensor located along the cargo box, or both; wherein the sensor is a capacitive touch sensor located along one or more of the bed caps.

9. The tonneau cover assembly of claim 2, wherein the drive system includes a first motor located in the canister near a first side rail and a second motor located in the canister near a second opposing side rail, and the first motor and the second motor are both in communication with the cable to move the plurality of connected slats.

10. The tonneau cover assembly of claim 2, wherein the motor includes a mounting plate, and the motor is mounted to a body or panel of the canister by the mounting plate.

11. The tonneau cover assembly of claim 3, wherein the canister is covered along an upper surface by a front panel of the tonneau cover, and the motor is positioned directly beneath the front panel.

12. The tonneau cover assembly of claim 1, wherein each of the plurality of connected slats comprise an end cap, the end cap comprises an extension extending laterally away from the end cap, the end cap comprising a bearing connected to the extension and configured to roll within an opening of one of the opposing side rails.

13. The tonneau cover assembly of claim 12, wherein the end cap comprises an edge and a lip, wherein as the plurality of connected slats are guided along the opposing side rails, and to prevent overextension or overbending of the plurality of connected slats relative to each other, in an event the plurality of connected slats bend relative to one another, the edge of one end cap contacts or engages the lip of another end cap.

14. A tonneau cover assembly for a cargo box of a vehicle, comprising:
   (a) opposing side rails configured to attach to opposing sides of the cargo box;
   (b) a tonneau cover comprising a plurality of connected slats extending between and supported by the opposing side rails;
   (c) a drive system configured to move the plurality of connected slats along the side rails between an open position and a closed position; and
   (d) a rear slat or panel that is connected to the plurality of connected slats and is located adjacent to a tailgate of the vehicle when the tonneau cover is in the closed position;
   wherein the drive system includes a motor and a drive gear that engages a helical cable, and the helical cable is only connected to the rear slat or panel, the motor is configured to move the helical cable to pull the rear slat or panel away from the tailgate to move the plurality of connected slats into the open position and to the helical cable to push the rear slat or panel towards the tailgate to move the plurality of connected slats into the closed position,
   wherein at least one of the opposing side rails comprises an opening having i) a support surface for supporting at least an end portion of the plurality of connected slats, and ii) a cable channel through which the cable is routed from the motor to the rear slat or panel, the opening bas a C-shaped cross section.

15. The tonneau cover assembly of claim 14, wherein each of the plurality of connected slats comprise an end cap, the end cap comprises an extension extending laterally away from the end cap, the end cap comprising a bearing connected to the extension and configured to roll within an opening of one of the opposing side rails.

16. The tonneau cover assembly according to claim 1, wherein at least one of the opposing side rails comprises an opening having i) a support surface for supporting at least an end portion of the plurality of connected slats, and ii) a cable channel through which the cable is routed from the motor to the rear slat or panel.

17. The tonneau cover assembly according to claim 16, wherein the opening is defined between an overhang portion at an upper end of the opening and a lip at the lower end of the opening, wherein the opening has a C-shaped cross section.

18. The tonneau cover assembly according to claim 17, wherein the opening comprises a connecting wall between the overhang portion and the lip, wherein the cable channel extends from the connecting wall.

19. The tonneau cover assembly according to claim 18, wherein the cable channel extends inwardly from the connecting wall and is generally vertically aligned with the plurality of connected slats.

20. The tonneau cover assembly according to claim 19, wherein a top surface of the plurality of connected slats is vertically below a top surface of at least one of the opposing side rails.

* * * * *